United States Patent
Burke et al.

(10) Patent No.: US 10,955,079 B2
(45) Date of Patent: Mar. 23, 2021

(54) INDUSTRIAL FLOW AND PRESSURE STABILIZER SYSTEM

(71) Applicant: BLACOH FLUID CONTROLS, INC., Riverside, CA (US)

(72) Inventors: James Stanley Burke, Glendora, CA (US); Matthew O'Hagan, Royal Oak, MI (US); Frank Knowles Smith, III, Mandeville, LA (US); Howard Frank, Tomball, TX (US)

(73) Assignee: BLACOH FLUID CONTROLS, INC., Riverside, CA (US)

( * ) Notice: Subject to any disclaimer, the term of this patent is extended or adjusted under 35 U.S.C. 154(b) by 0 days.

(21) Appl. No.: 16/472,179

(22) PCT Filed: Mar. 1, 2019

(86) PCT No.: PCT/US2019/020427
§ 371 (c)(1),
(2) Date: Jun. 20, 2019

(87) PCT Pub. No.: WO2019/169349
PCT Pub. Date: Sep. 6, 2019

(65) Prior Publication Data
US 2020/0300400 A1   Sep. 24, 2020

Related U.S. Application Data

(60) Provisional application No. 62/637,330, filed on Mar. 1, 2018.

(51) Int. Cl.
*F16L 55/053*   (2006.01)

(52) U.S. Cl.
CPC ................ *F16L 55/053* (2013.01)

(58) Field of Classification Search
USPC ...................................... 138/26, 30
See application file for complete search history.

(56) References Cited

U.S. PATENT DOCUMENTS 2,341,556 A   2/1944   Joy
2,504,424 A * 4/1950   Kraak ............... F16L 55/052
                                                           138/30

(Continued)

OTHER PUBLICATIONS

International Search Report and Written Opinion of the International Searching Authority dated May 8, 2019.

*Primary Examiner* — Patrick F Brinson
(74) *Attorney, Agent, or Firm* — Knobbe, Martens, Olson & Bear, LLP

(57) ABSTRACT

A pressure fluctuations mitigation system for an industrial flow operation is provided. The system includes a bellows assembly positioned within a pressure vessel. The bellows assembly can include two segments that are joined with a center ring to form a seal that allows the bellows assembly performs as would a unitary bellows structure. The bellows assembly encloses an internal space that is fluidically isolated from the interior space of the pressure vessel. The bellows assembly has a corrugated sidewall that extends along a longitudinal axis from a first collar portion to a second collar portion. The sidewall has a hollow cylindrical shape and is made of polytetrafluoroethylene. The sidewall has an outer diameter of more than 18 inches.

20 Claims, 19 Drawing Sheets

(56) References Cited

U.S. PATENT DOCUMENTS

| | | | | |
|---|---|---|---|---|
| 2,638,932 A | * | 5/1953 | Alexander | F15B 1/106 138/30 |
| 3,314,276 A | | 4/1967 | Peyton | |
| 4,483,665 A | | 11/1984 | Hauser | |
| 4,610,369 A | * | 9/1986 | Mercier | F15B 1/10 138/30 |
| 4,817,688 A | | 4/1989 | Corniea | |
| 5,345,857 A | | 9/1994 | Murphy | |
| 5,848,617 A | | 12/1998 | Enomoto | |
| 5,937,895 A | | 8/1999 | Le Febre | |
| 6,041,820 A | * | 3/2000 | Boehme | F24D 3/08 138/30 |
| 8,875,741 B2 | * | 11/2014 | Lee | B60T 8/4068 138/31 |
| 2017/0298914 A1 | | 10/2017 | Mori et al. | |

\* cited by examiner

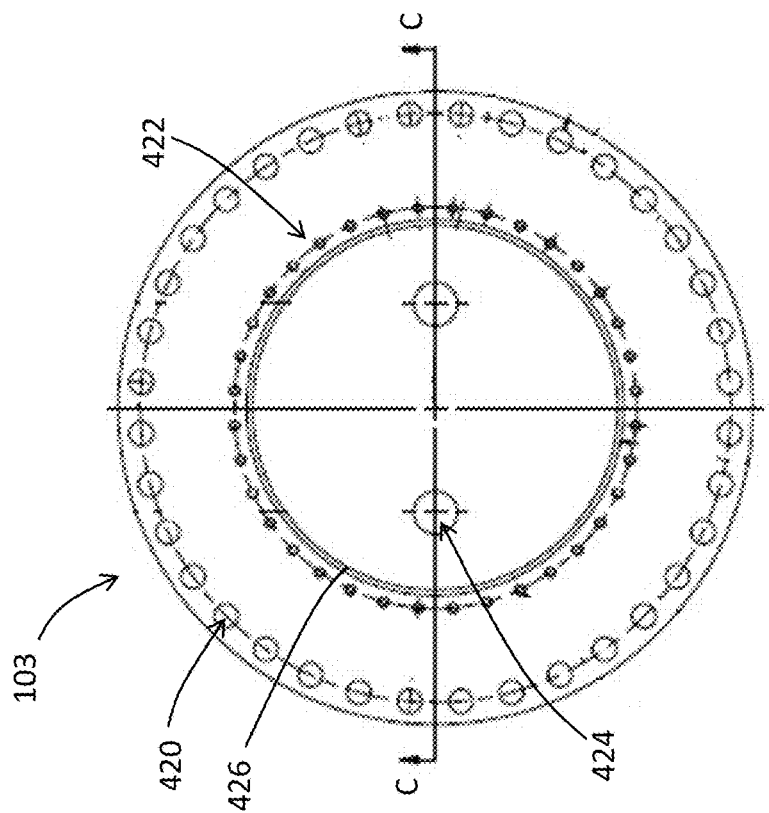
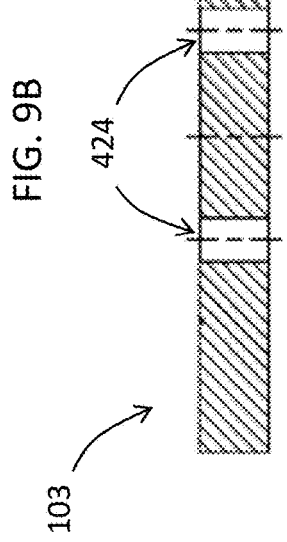
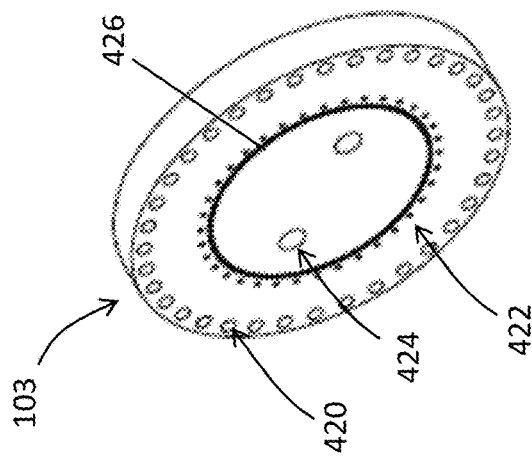
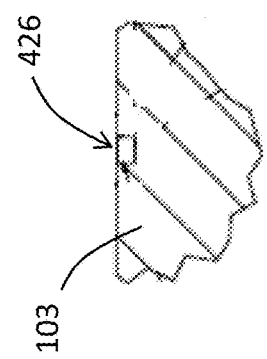

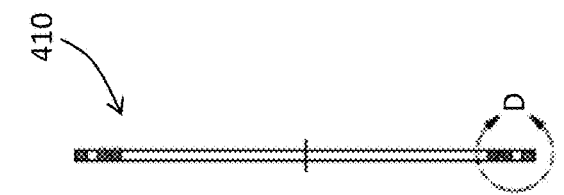
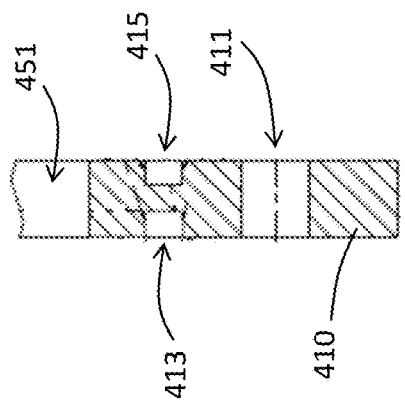
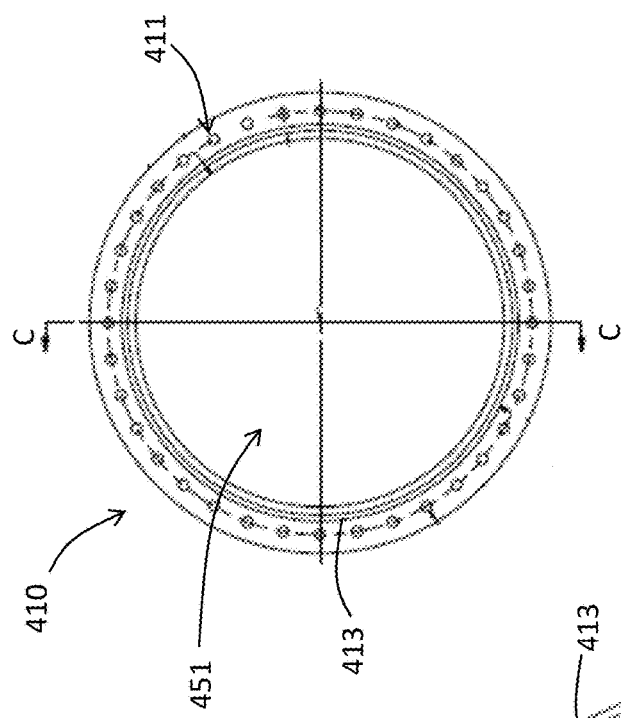
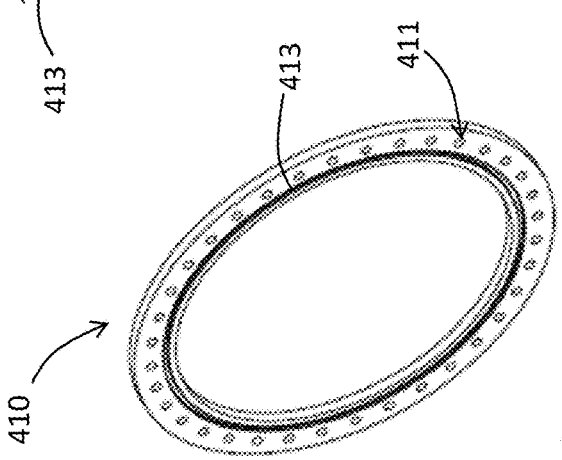
FIG. 11C
FIG. 11D
FIG. 11B
FIG. 11A

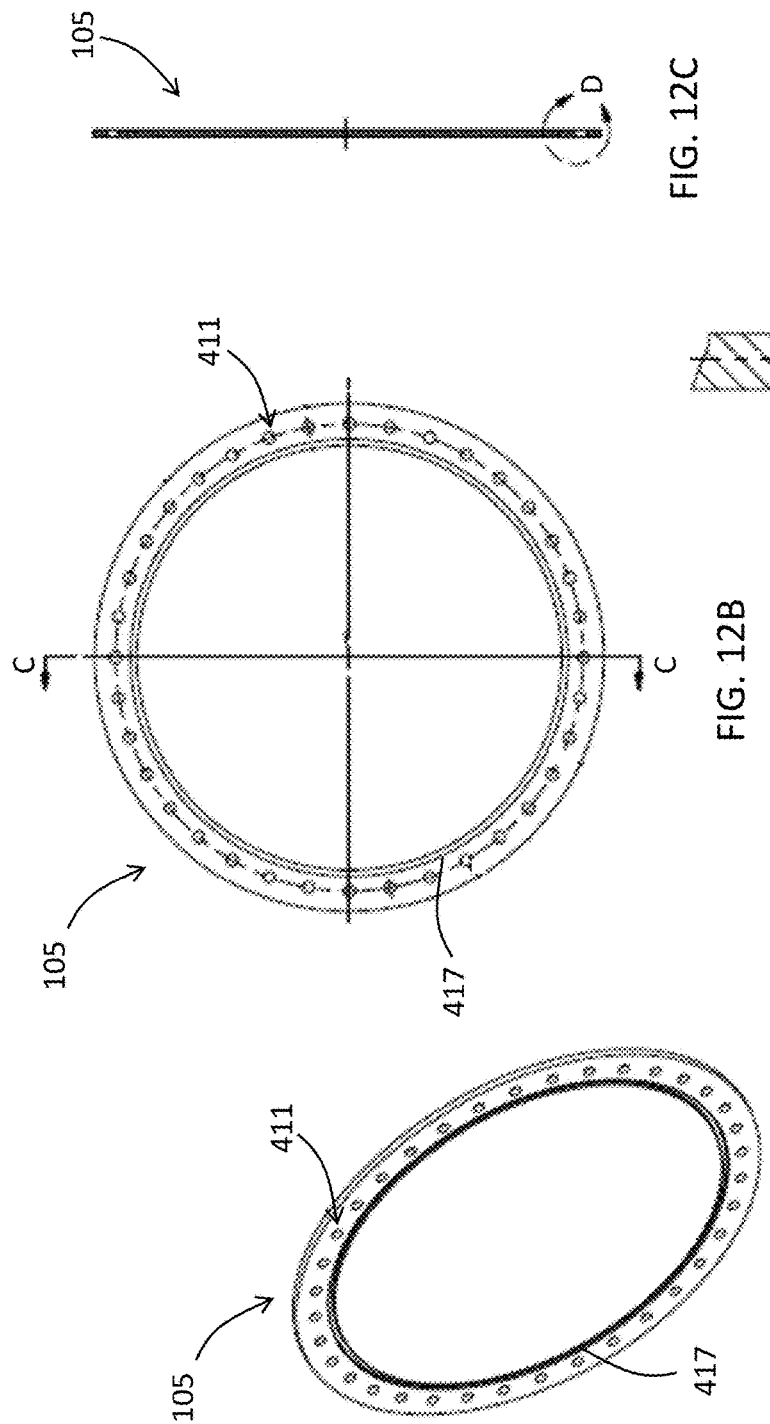

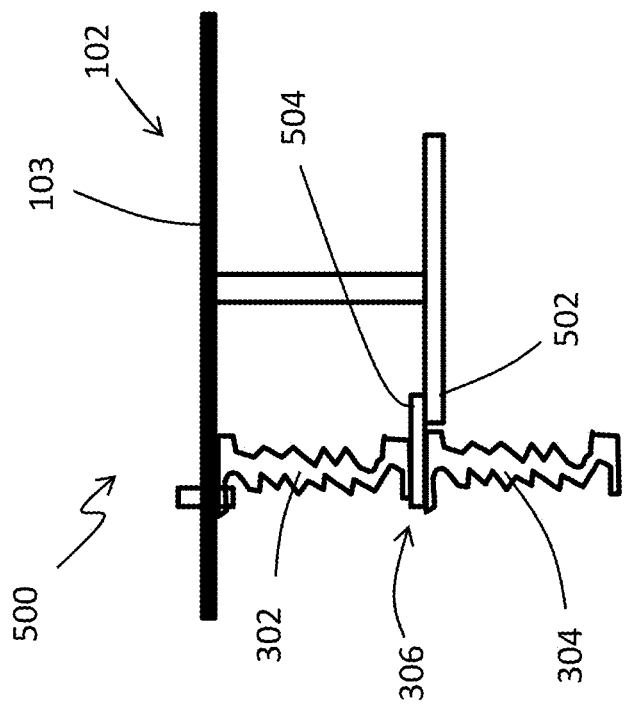
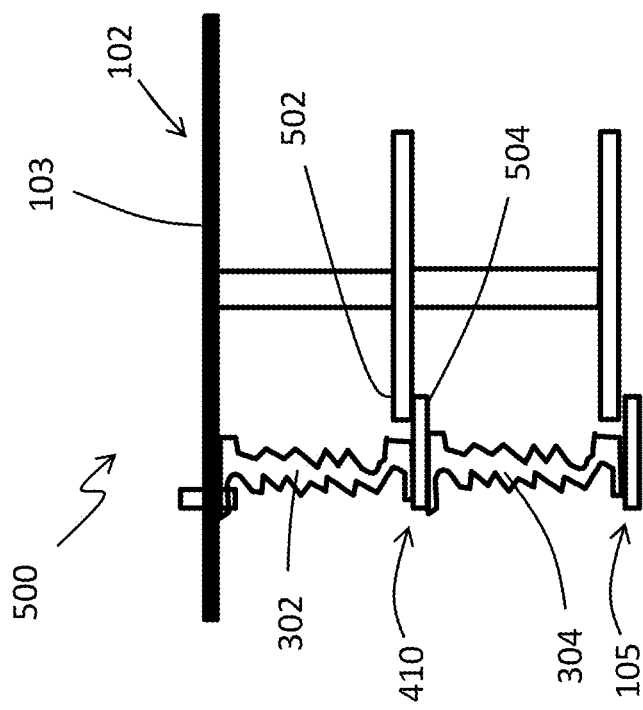
FIG. 14A
FIG. 14B

INDUSTRIAL FLOW AND PRESSURE STABILIZER SYSTEM

CROSS-REFERENCE TO RELATED APPLICATIONS

This application is a National Stage of PCT Application No. PCT/US2019/020427, titled INDUSTRIAL FLOW AND PRESSURE STABILIZER SYSTEMS, filed on Mar. 1, 2019, which claims the benefit of U.S. Provisional Application No. 62/637,330, titled PRESSURE MITIGATING BELLOWS, filed on Mar. 1, 2018. The disclosures of the prior applications are incorporated by reference herein in their entireties and should be considered a part of this application.

BACKGROUND

Field

This disclosure generally relates to systems, methods, and devices for stabilizing fluid flow and pressure in piping systems and, in particular, for mitigating pressure fluctuations in industrial flow operations.

Description of Certain Related Art

Industrial flow systems often include large pressure vessels that contain chemically-reactive substances under high pressure and temperature conditions. In some applications, large heat and pressure swings can occur during operation of the industrial flow system. The pressure and heat fluctuations may cause damage to the entire system over time. Flexible bladders or bellows systems have been developed to mitigate pressure fluctuations. For example, a flexible bladder or bellows can be placed inside a pressure vessel to separate an inert pressurized gas from the system fluid to mitigate pressure fluctuations in the fluid. It is however difficult and time consuming to properly seal such flexible bladder or bellows for large industrial size pressure vessels. Improper installation of bellows can result in leaks and other process failures. A need exists for a pressure fluctuations mitigation system that is effective in mitigating wide pressure swings in large industrial flow system and can be easily installed.

SUMMARY

The systems, methods and devices described herein have innovative aspects, no single one of which is indispensable or solely responsible for their desirable attributes. Without limiting the scope of the claims, some of the advantageous features will now be summarized.

Embodiments of the present disclosure relate to systems and methods for mitigating pressure fluctuation in industrial size piping systems. Some of the systems described herein are pressure fluctuations mitigation systems designed to facilitate quick and effective installation in large pressure vessels. The systems may comprise a pressure vessel (e.g., a surge vessel), a large diameter bellows assembly configured to be installed inside the pressure vessel as a singular piece, a center ring, and an end cap. The pressure vessel can include a flow inlet, a flow outlet, and a cover, the flow inlet and the flow outlet providing a flow path to an interior space enclosed by the cover and the pressure vessel. The bellows assembly can comprise a first segment and a second segment. Each of the first and second segments can comprise a first collar portion, a second collar portion, and a sidewall extending between the first and second collar portions. The sidewall can have a generally hollow cylindrical shape and comprise a plurality of folds. The hollow cylindrical shape defined by the sidewall can have an outer diameter greater than 18 inches, or between 18 inches and 36 inches. The first collar portion of the first segment can be attached to the cover. The center ring can be disposed between the first and second segments. The first collar portion of the second segment can be disposed between the center ring and the second collar portion of the second segment. The first and second segments sealingly engage with each other, thus allowing the bellows assembly to be installed as a singular piece. The end cap can be attached to the second collar portion of the second segment. The cover, the end cap, and the bellows assembly can define an internal space that is fluidically isolated from the interior space of the pressure vessel. In some embodiments, the plurality of folds in the bellows assembly can be made of polytetrafluoroethylene (PTFE). In some embodiments, the bellows assembly can have a large internal diameter sized to correspond to the size of an industrial vessel. In some embodiments, the bellows assembly is installed into a pressure vessel having an internal diameter of 27.5 inches.

In some aspects, a bellows assembly is disclosed. The bellows assembly can comprise a first segment. The first segment can comprise a first collar portion, a second collar portion, and a sidewall extending between the first and second collar portions. The sidewall can have a generally hollow cylindrical shape and comprise a plurality of folds. The first segment can be made of PTFE and have an outer diameter of between 25 and 27 inches.

In some aspects, a method of manufacturing a bellows assembly is disclosed. The method comprises obtaining a hollow cylindrical form of PTFE. The method further comprises cutting a first plurality of grooves on an outer surface of the hollow cylindrical form such that each of the first plurality of grooves circumferentially surrounds a longitudinal axis of the hollow cylindrical form while maintaining a fixed longitudinal position with respect to the hollow cylindrical form. The method further comprises, cutting a second plurality of grooves on the inner surface of the hollow cylindrical form after cutting the first plurality of grooves such that each of the second plurality of grooves circumferentially surrounds the longitudinal axis of the hollow cylindrical form while maintaining a fixed longitudinal position with respect to the hollow cylindrical form.

Any of the features, components, or details of any of the arrangements or embodiments disclosed in this application, including without limitation any of the pressure fluctuation mitigation system embodiments and any of the methods of dampening pressure surges disclosed below, are interchangeably combinable with any other features, components, or details of any of the arrangements or embodiments disclosed herein to form new arrangements and embodiments.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

FIG. 9A illustrates an isometric view of a cover of the bellows assembly.

FIG. 9B illustrates a top view of the cover of FIG. 9A.

FIG. 9C illustrates a cross-sectional view of the cover of FIG. 9A.

FIG. 9D illustrates a close-up view of a portion of the cover of FIG. 9C.

FIG. 11A illustrates an isometric view of a center ring of the bellows assembly.

FIG. 11B illustrates a top view of the center ring of FIG. 11A.

FIG. 11C illustrates a side view of the center ring of FIG. 11A.

FIG. 11D illustrates a close-up view of a portion of the center ring of FIG. 11C.

FIG. 12A illustrates an isometric view of an end cap of the bellows assembly.

FIG. 12B illustrates a top view of the end cap of FIG. 12A.

FIG. 12C illustrates a side view of the end cap of FIG. 12A.

FIG. 12D illustrates a close-up view of a portion of the end cap of FIG. 12C.

FIG. 14A illustrates an embodiment of an internal support system.

FIG. 14B illustrates an embodiment of an internal support system.

DETAILED DESCRIPTION

Figure 1:
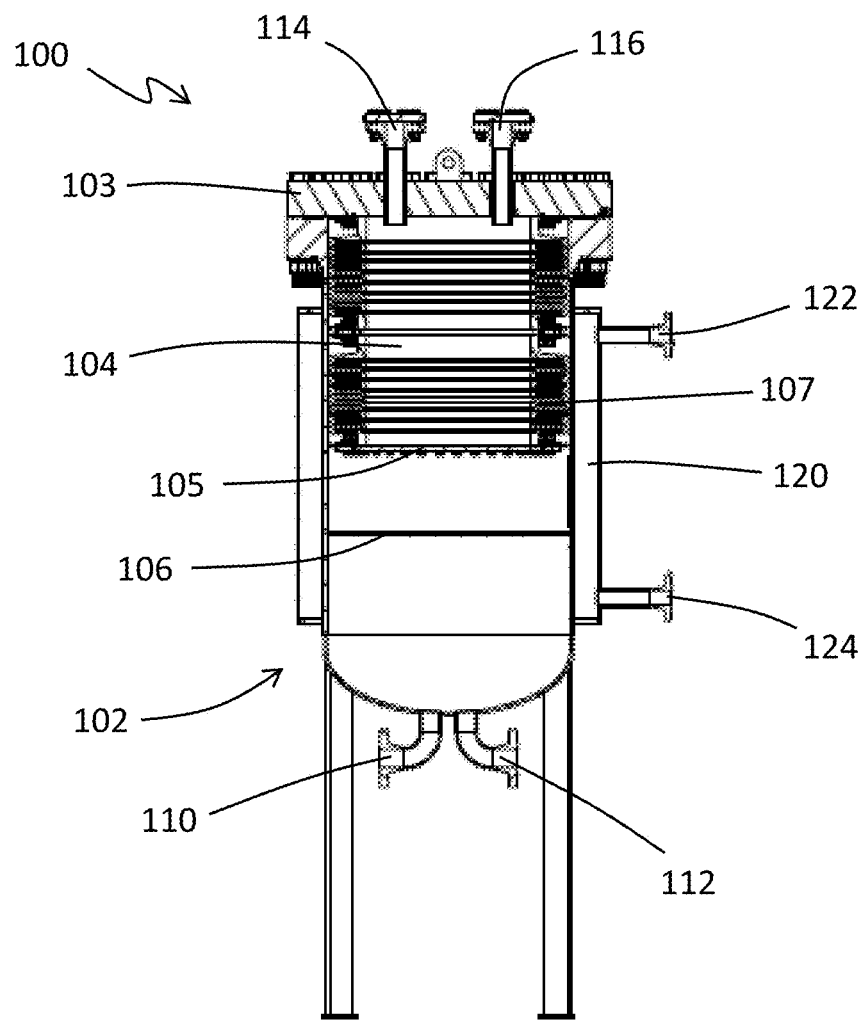
FIG. 1 is a side cross-sectional view of an embodiment of a pressure fluctuations mitigation system.

Embodiments of systems, components and methods of assembly and manufacture will now be described with reference to the accompanying figures, wherein like numerals refer to like or similar elements throughout. Each and every feature described herein, and each and every combination of two or more of such features, is included within the scope of the present invention provided that the features included in such a combination are not mutually inconsistent. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIG. 1 shows a cross-sectional side view of an embodiment of a pressure fluctuations mitigation system 100 of the present disclosure. The pressure fluctuations mitigation system 100 can include a pressure vessel 102. The pressure vessel 102 can have an expandable bellows assembly 104 enclosed therein. The bellows assembly 104 can have a large inner diameter that corresponds to the inner diameter of the pressure vessel 102 of a large industrial flow system. In some embodiments, the pressure vessel 102 can have an inner diameter of 27.5 inches. The bellows assembly 104 can include a sidewall 107. The sidewall 107 can have a generally hollow, cylindrical shape and can include one or more folds or corrugations that allow the bellows assembly 104 to extend or shorten along the longitudinal axis of the cylindrical shape of the sidewall 107. The bellows assembly 104 can include an end cap 105. The end cap 105 can be adapted to form a seal with the sidewall 107 of the bellows assembly 104. The end cap 105 and the sidewall 107 can define an internal space within the bellows assembly 104. The other end of the bellows assembly 104 can be sealed by a cover 103 of the pressure vessel 102. The bellows assembly 104 can sit within the pressure vessel 102, as shown in FIG. 1. The space surrounded by the sidewall 107 of the bellows assembly 104 can be considered a doubly-enclosed space in that this space is enclosed first by the bellows assembly 104 and second by the pressure vessel 102 that surrounds the bellows assembly 104 itself. The space within the bellows assembly 104 can be fluidically isolated from the interior space of the pressure vessel 102. The extent the bellows assembly 104 can expand longitudinally away from the cover 103 can be limited by a divider plate 106 disposed within the interior space of the pressure vessel 102. The position of the divider plate 106 can be fixed relative to the interior wall of the pressure vessel 102. In one embodiment, the pressure vessel may contain di-nitrile toluene at a temperature above 190 F and may experience pressures that can exceed 600 psi.

Figure 2:
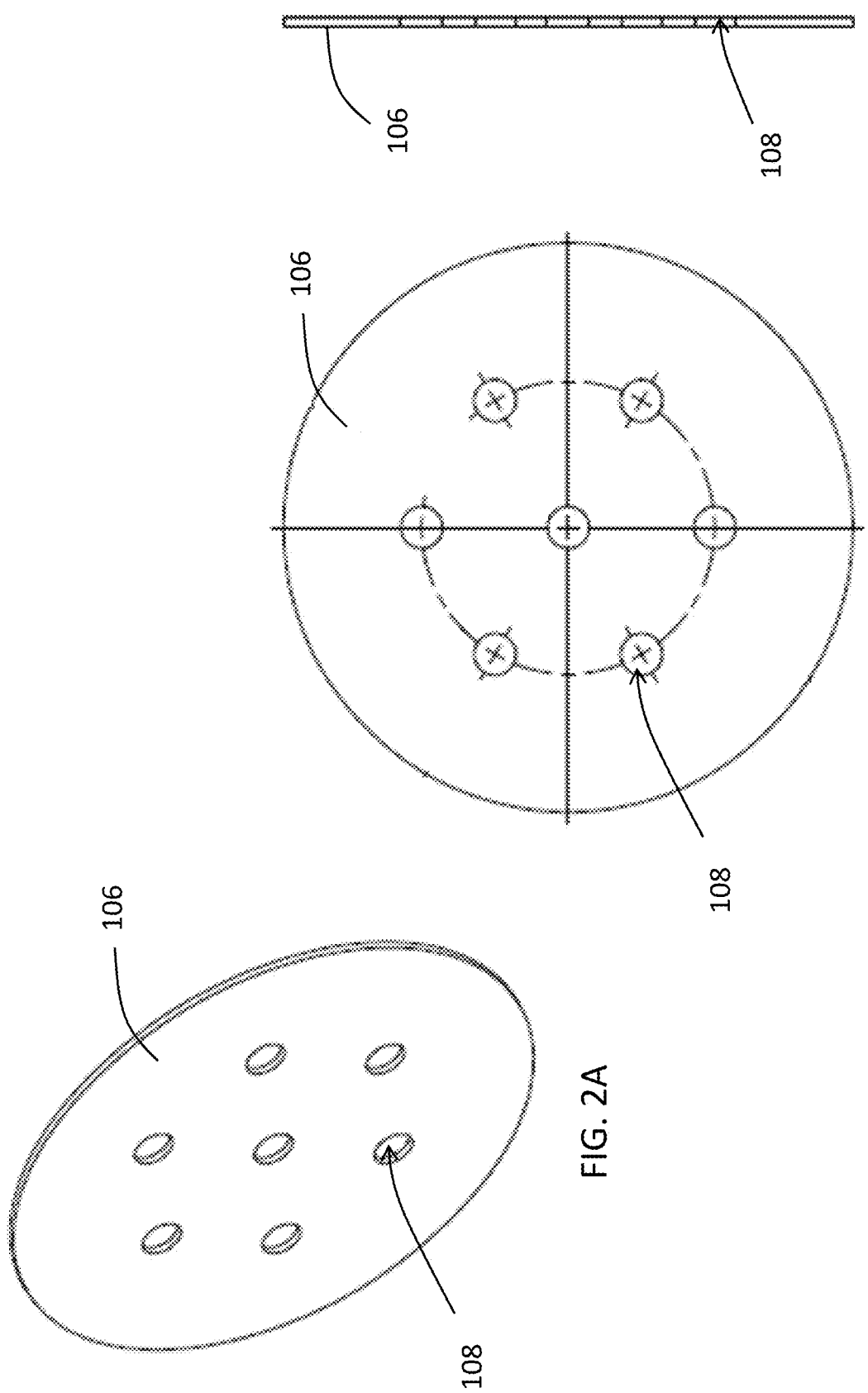
FIG. 2A illustrates an isometric view of a divider plate.
FIG. 2B illustrates a top view of the divider plate of FIG. 2A.
FIG. 2C illustrates a side view of the divider plate of FIG. 2A.

FIGS. 2A-2C illustrate different views of an embodiment of a divider plate 106. FIG. 2A shows an isometric view of the divider plate 106. FIG. 2B shows a top view of the divider plate 106. FIG. 2C shows a side cross-sectional view of the divider plate 106. The divider plate 106 can include one or more through holes 108 that allow fluid to pass across the divider plate 106. The divider plate 106 can limit the longitudinal movement of the bellows assembly 104 while allowing fluid within the pressure vessel 102 to pass to either side of the divider plate 106.

Turning back to FIG. 1, the pressure-mitigating system 100 can include a flow inlet 110 and a flow outlet 112. The flow inlet 110 and the flow outlet 112 can be adapted to allow the pressure vessel 102 to be connected in-line with a piping system of an industrial flow system. In some embodiments, the flow inlet 110 and the outlet 112 are combined into a single nozzle that handles the inlet and outlet of the fluid. The pressure-mitigating system 100 can include a charging inlet 114 and a charging outlet 116. The charging inlet 114 and the charging outlet 116 can be fluidically connected to the internal space enclosed by the bellows assembly 104. The charging inlet 114 and the charging outlet 116 can be adapted to allow the internal space of the bellows assembly 104 to be connected in-line with a bellows-pressurizing piping system. In this way, the internal space of the bellows assembly 104 can be provided a pressure that is different from the internal space of the pressure vessel 102. In some embodiments, the charging inlet 114 and the charging outlet 116 can be differently arranged depending on the application of the pressure fluctuations mitigation system 100. For example, in some embodiments, there is only one connection (e.g., charging inlet 114 without charging outlet 116; charging outlet 116 without charging inlet 114). In some embodiments, the charging inlet 114 and/or the charging outlet 116 can include additional instrumentation such as a gauge and/or pressure relief valve and/or a transducer (e.g., pressure transducer).

As discussed herein, when the pressure of the fluid in the internal space of the pressure vessel 102 increases, the increased pressure can be mitigated by compressing the bellows assembly 104. The dampening characteristics of the pressure-mitigating system 100 can be determined by selecting the pressure level within the internal space of the bellows assembly 104. In some embodiments, the pressure-dampening characteristics of the pressure-mitigating system 100 can be tuned or modified by tuning or modifying the pressure within the internal space of the bellows assembly 102, as discussed herein. The bellows assembly 104 can include two or more portions (e.g., segment 303, FIG. 6A) that are joined by a connecting structure (e.g., center ring 410, FIG. 11A). The connecting structure can form a seal between each of the portions such that the assembly of the portions and the connecting structure dampens pressure fluctuations as effectively as a unitary portion having the same overall longitudinal length and inner diameter as the joined portions. In some aspects, the connecting structure allows the bellows assembly 104 to be installed into the pressure vessel 102 as a unitary piece. In some aspects, the connecting structure allows the bellows assembly 104 to utilize portions that have a shorter longitudinal length, which can simplify machining of the bellows assembly 104 when the portions are made from a chemically-resistant material such as PTFE.

With continued reference to FIG. 1, the pressure-mitigating system 100 can include a temperature-regulating jacket 120. The temperature-regulating jacket 120 can define an enclosed space that circumferentially surrounds at least a portion of the outer surface of the pressure vessel 102. The temperature-regulating jacket 120 can include a jacket inlet 122 and a jacket outlet 124 that are each fluidically coupled with the enclosed space of the temperature-regulating jacket 120. The jacket inlet and outlet 122, 124 can be adapted to allow a fluid (e.g., water) to be circulated through the enclosed space of the temperature-regulating jacket 120, thereby allowing the pressure vessel 102 to be heated or cooled by the temperature-regulating jacket 120. In some embodiments, the industrial flow operation may not require temperature regulation of the pressure vessel 102. Accordingly, in some embodiments, the pressure-mitigating system 100 may not include a temperature-regulating jacket 120.

Figure 3:
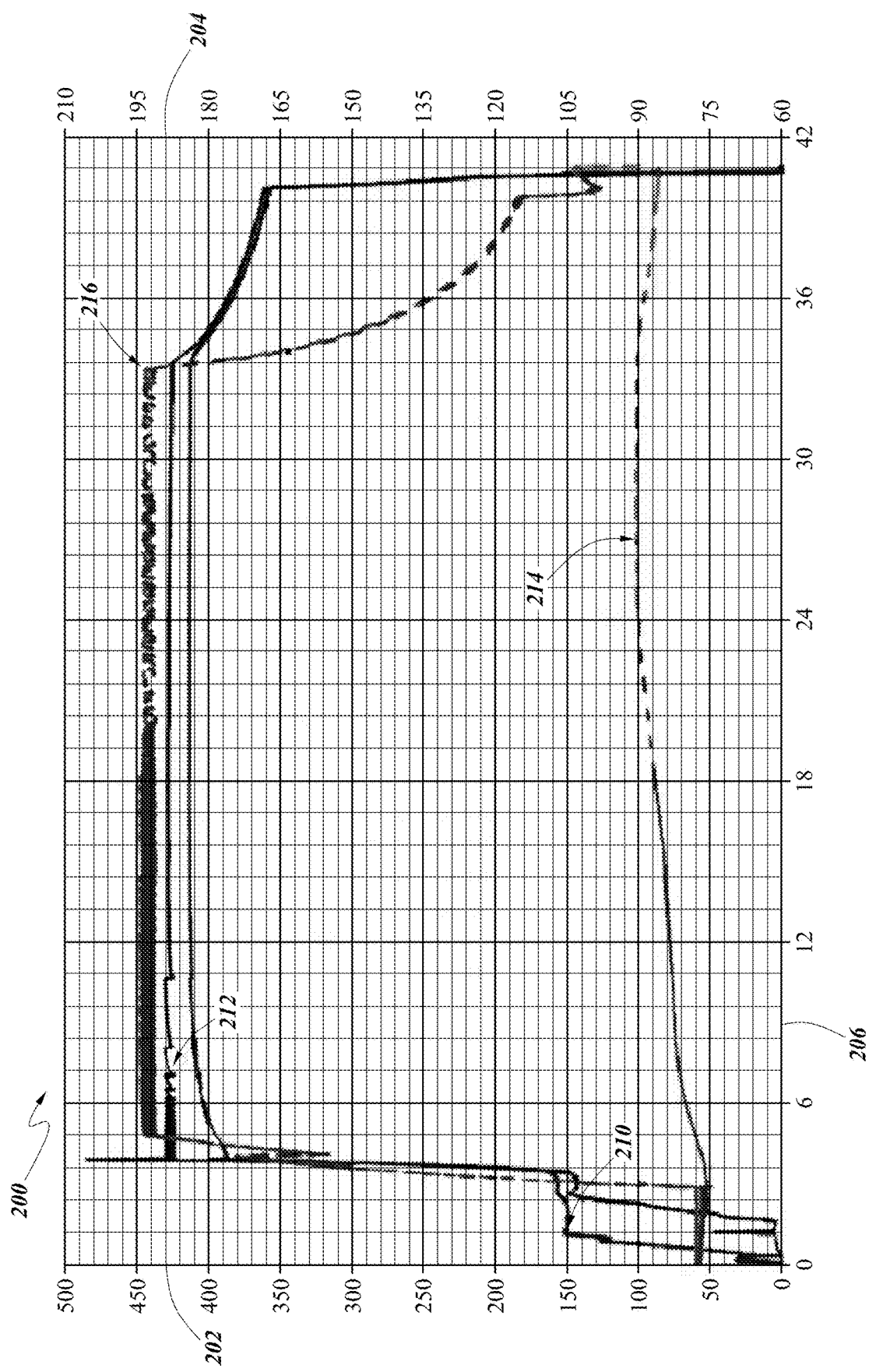
FIG. 3 illustrates a graph of temperature and pressure values at different locations of the pressure fluctuations mitigation system during a hydrostatic test.

FIG. 3 illustrates a graph 200 of a hydrostatic test for the pressure-mitigating system 100. The testing can be performed to confirm that the bellows assembly 104 has properly functioning seals, as discussed herein. The left ordinate 202 of the graph 200 corresponds to pressure values in pounds per square inch (psi). The right ordinate 204 of the graph 200 corresponds to temperature values in degrees Fahrenheit (° F.). The abscissa 206 of the graph 200 corresponds to elapsed time in hours. The pressure within the bellows assembly 104 can be represented by a bellows-pressure plot line 210. The internal space of the bellows assembly 104 can be pressurized by introducing a charging fluid (e.g., air) into the internal space of the bellows assembly 104. The charging fluid can enter the internal space of the bellows assembly 104 through the charging inlet 114, as described herein. The charging fluid can exit the internal space of the bellows assembly 104 through the charging outlet 116. In some arrangements, the charging outlet 116 can include a check-valve or regulator that opens only when the pressure within the bellows assembly 104 reaches a threshold value. In some embodiments, the charging outlet 116 does not include a check-valve or regulator that opens only when the pressure within the bellows assembly 104 reaches a threshold value. The pressure within the pressure vessel 102 can be represented by a vessel-pressure plot line 212. The vessel-pressure plot line 212 can indicate the fluid pressure at the flow inlet 110 or the flow outlet 112 of the pressure vessel 102. In some embodiments, the vessel-pressure plot line 212 can correspond to the fluid pressure within an industrial flow system. The temperature within the pressure vessel 102 can be represented by a vessel-temperature plot line 214. The vessel-temperature plot line 214 can indicate the fluid temperature at the flow inlet 110 or the flow outlet 112 of the pressure vessel 102. In some embodiments, the vessel-temperature plot line 214 can correspond to the fluid pressure within an industrial flow system. The temperature within the temperature-regulating jacket 120 can be represented by a jacket-temperature plot line 216. The jacket-temperature plot line 216 can indicate the fluid temperature at the jacket inlet 122 or the jacket outlet 124 of the pressure vessel 102.

With continued reference to FIG. 3, the bellows-pressure plot line 210 can rise to 150 psi while the vessel-pressure plot line 212 remains near zero. This can correspond to the internal space of the bellows assembly 104 being pre-charged with a fluid (e.g., air) before the internal space of the pressure vessel 102 is pressurized. Once the bellows assembly 104 has been charged, the fluid in the internal space of the pressure vessel 102 can be pressurized, as shown by the vessel-pressure plot line 212 climbing to 150 psi near the 3-hour time point. The oscillations in the vessel-pressure plot line 212 that are shown around the 6-hour time point can correspond to a pressure maintenance of the system 100, in which the system 100 is bled as the pressure vessel 102 heats up. Near the 33-hour time point, the jacket-temperature plot line 216 decays, which can correspond to the heater being turned off for the temperature-regulating jacket 120. Near the 40-hour time point, the jacket-temperature plot line 216 decays at a faster rate, which can correspond to cold tap water being circulated through the temperature-regulating jacket 120 to more quickly cool down the pressure vessel 102. Also near the 40-hour time point, the bellows-pressure plot line 210 and the vessel-pressure plot line 212 decay rapidly as the fluid (e.g., water) in the pressure vessel 102 is bled down followed by the bleeding down the fluid (e.g., air) within the bellows assembly 104.

Figure 4:
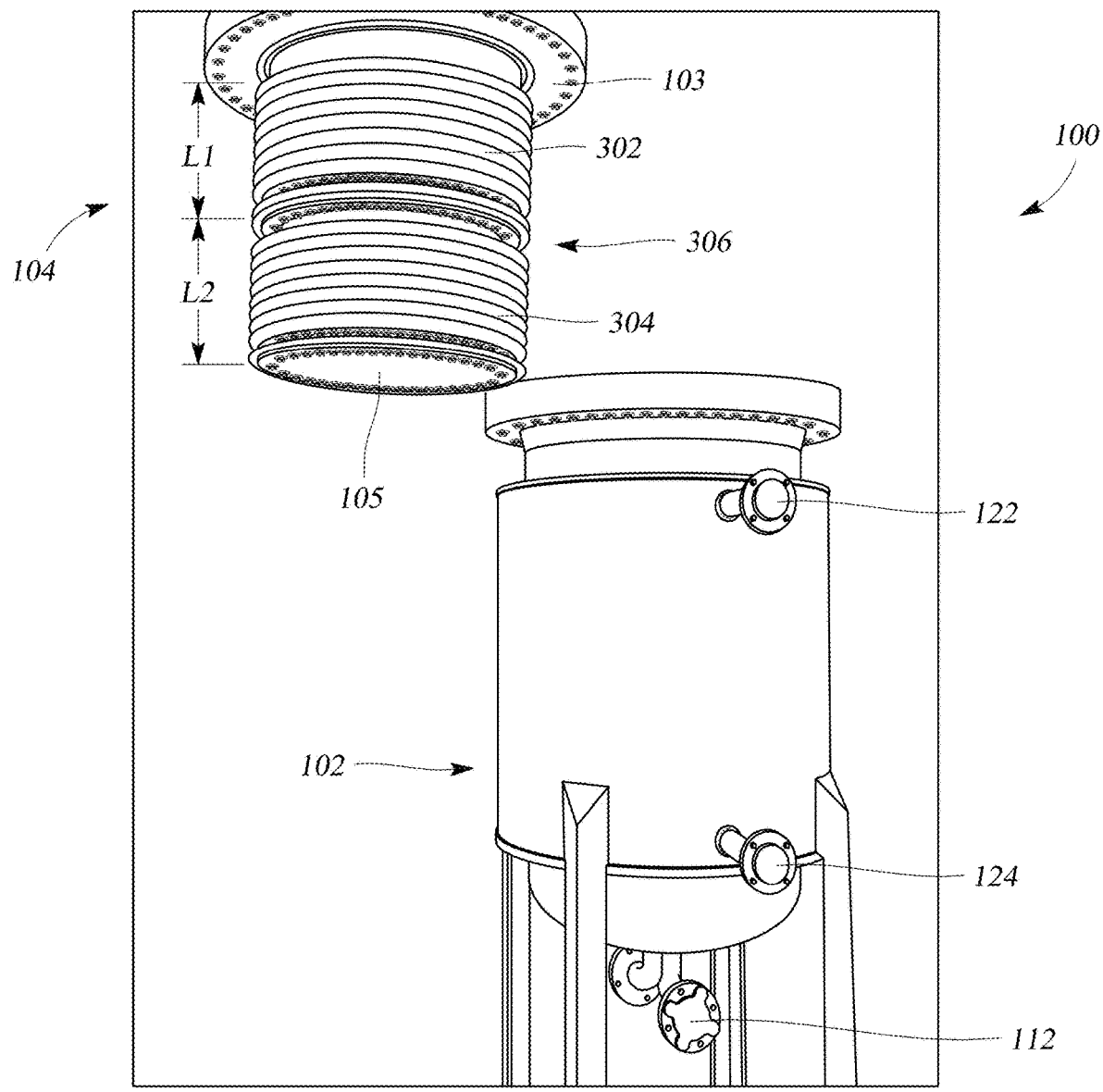
FIG. 4 illustrates a pressure fluctuations mitigation system in a state of partial disassembly.

FIG. 4 illustrates an embodiment of the pressure-mitigating system 100 in a state of partial disassembly. In FIG. 4, the bellows assembly 104 has been lifted out of the pressure vessel 102 to more clearly shown the bellows assembly 104. In the illustrated embodiment, the bellows assembly 104 includes a first segment 302 and a second segment 304 that are joined together by an intermediate collar structure 306. The first segment 302 can have a longitudinal length (L1) and the second segment 304 can have a longitudinal length (L2), as indicated in FIG. 4. In the illustrated embodiment, L1 and L2 are approximately equal to one another. In some embodiments, L1 can be greater than, less than, or equal to L2. In some embodiments, the segments 302, 304 have a longitudinal length (L1, L2) that is about: 8 inches, 10 inches, 12 inches, 13 inches, 15 inches, 18 inches, 24 inches, a value between the aforementioned values, or otherwise. In some embodiments, the longitudinal length (L1, L2) of the segments 302, 304 can be within a range: from 8 inches to 24 inches; from 10 inches to 22 inches; from 11 inches to 18 inches; from 12 inches to 13 inches; or otherwise.

As shown in FIG. 4, the bellows assembly 104 can be installed into the pressure vessel 102 as a unitary structure. In some embodiments, the bellows assembly 104 is assembled onto the cover 103 and then inserted into the pressure vessel 102 as a unitary structure. In some embodiments, the first segment 302 is first joined to the second segment 304 with the intermediate collar structure 306 and then that sub-assembly is installed onto the cover 103. In some embodiments, the first segment 302 is first installed on the cover 103 and then the second segment 304 is connected to the first segment 302 by the intermediate collar structure 306. The first and second segments 302, 304 can be made of polytetrafluoroethylene (PTFE). The outer diameter of the segments 302, 304 can be greater than 18 inches. In some embodiments, the segments 302, 304 have an outer diameter that is about: 16 inches, 18 inches, 22 inches, 26 inches, 27 inches, 28 inches, 32 inches, a value between the aforementioned values, or otherwise. In some embodiments, the outer diameter of the segments 302, 304 can be within a range: from 18 inches to 36 inches; from 20 inches to 34 inches; from 22 inches to 30 inches; from 24 inches to 28 inches; from 25 inches to 27 inches.

Figure 6B:
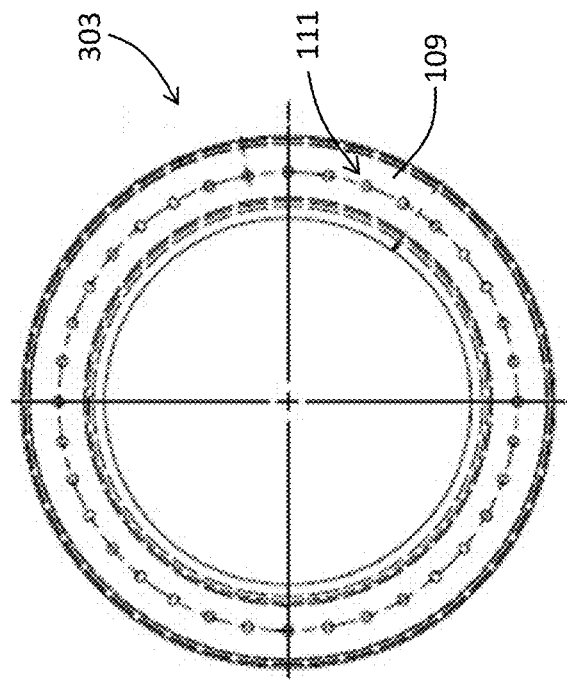
FIG. 6B illustrates a top view of the segment of FIG. 6A.
Figure 6C:
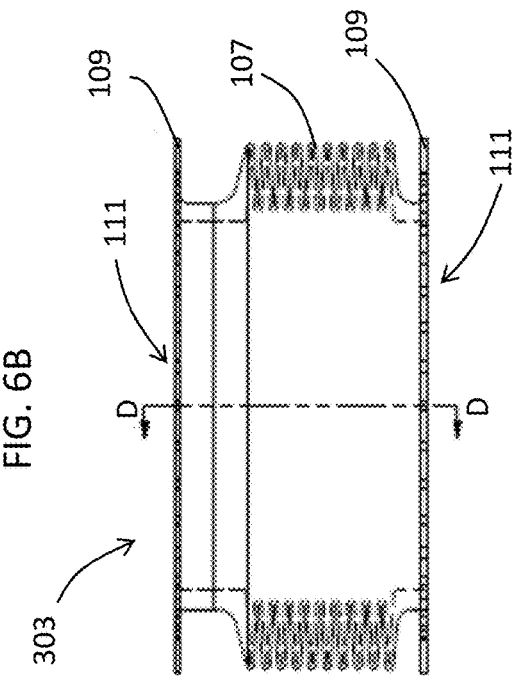
FIG. 6C illustrates a side view of the segment of FIG. 6A.

Machining large diameter PTFE bellows can be difficult. Reducing the longitudinal length of a large diameter PTFE bellows can simplify the machining of the bellows. As discussed herein, the bellows assembly 104 can include an intermediate collar portion 306 that allows two or more segments 302, 304 of reduced longitudinal length to be joined together in a sealing fashion to form a bellows assembly 104 that performs as effectively as would a single bellows having a comparable overall longitudinal length. In this way, the intermediate collar portion 306 can simplify machining of a large diameter PTFE bellows. In some aspects, the present disclosure is directed to a method of manufacturing a large diameter PTFE bellows having an outer diameter between 18 inches and 36 inches. In some embodiments, the method of manufacturing a large diameter PTFE bellows includes the steps of obtaining a portion of PTFE that is shaped as a hollow, cylindrical structure; cutting a first plurality of grooves on the outer surface of the hollow cylindrical PTFE structure; and cutting a second plurality of grooves on the inner surface of the hollow cylindrical PTFE structure. In some embodiments, the second plurality of grooves are cut on the inner surface of the hollow cylindrical PTFE structure after the first plurality of grooves have been cut on the outer surface of the hollow cylindrical PTFE structure. In some variants, the second plurality of grooves are cut on the inner surface before the first plurality of grooves are cut on the outer surface. In some embodiments, the grooves are cut alternately on the outer and inner surfaces of the hollow cylindrical PTFE structure. In some embodiments, the first plurality of grooves can interdigitate with the second plurality of grooves such that the sidewall of the hollow cylindrical PTFE structure defines a corrugated or folded shape, as shown in FIGS. 6D and 7D. In some embodiments, the hollow cylindrical PTFE structure is held fixed by the inner surface of the hollow cylindrical PTFE structure while the outer grooves are cut. In some embodiments, the hollow cylindrical PTFE structure is held fixed by the outer surface of the hollow cylindrical PTFE structure while the inner grooves are cut.

Figure 5C:
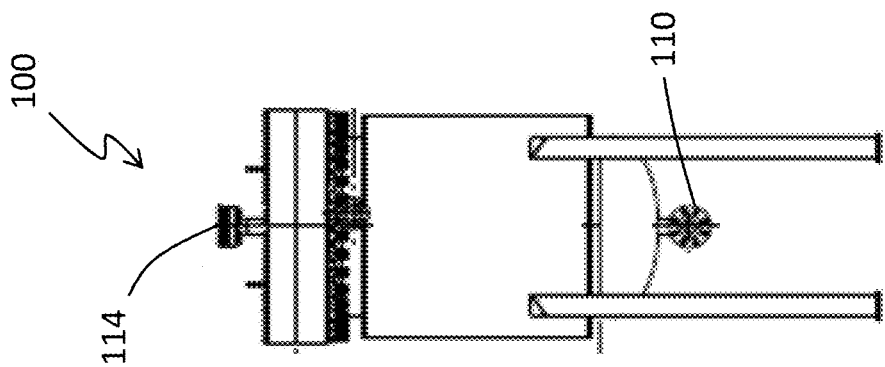
FIG. 5C illustrates a front view of the pressure fluctuations mitigation system of FIG. 5A.
Figure 5B:
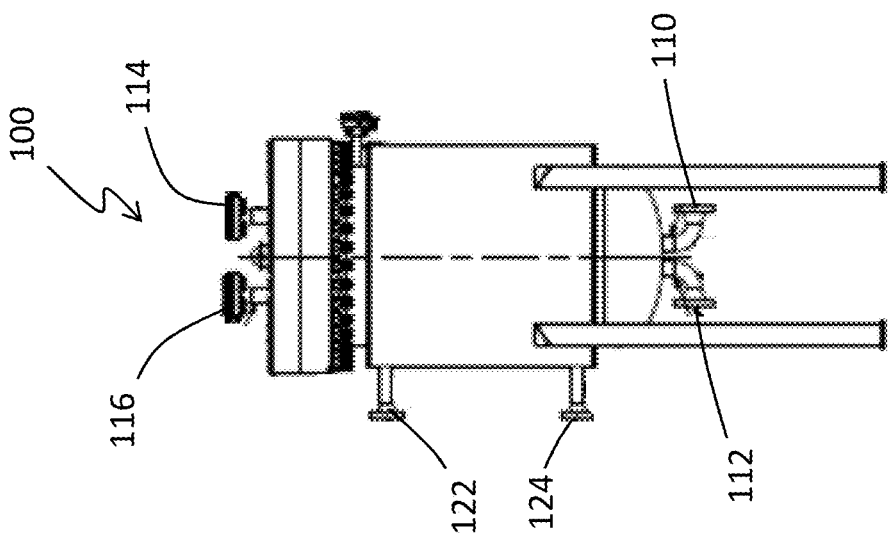
FIG. 5B illustrates a left view of the pressure fluctuations mitigation system of FIG. 5A.
Figure 5A:
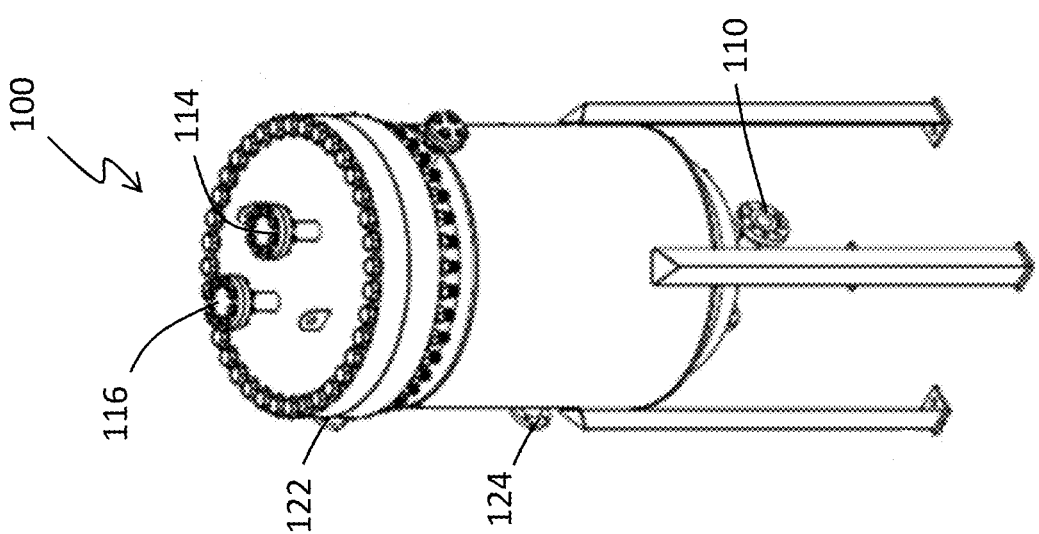
FIG. 5A illustrates an isometric view of a pressure fluctuations mitigation system of FIG. 1.
Figure 5E:
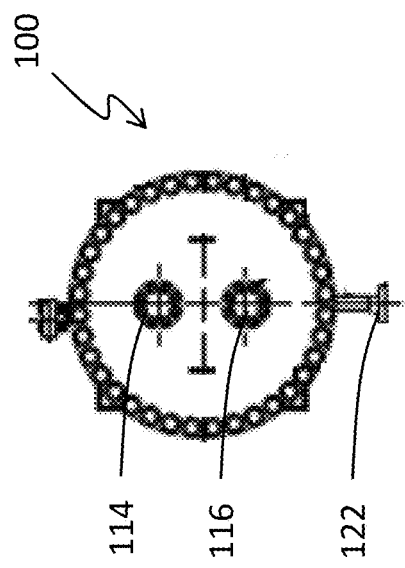
FIG. 5E illustrates a top view of the pressure fluctuations mitigation system of FIG. 5A.
Figure 5F:
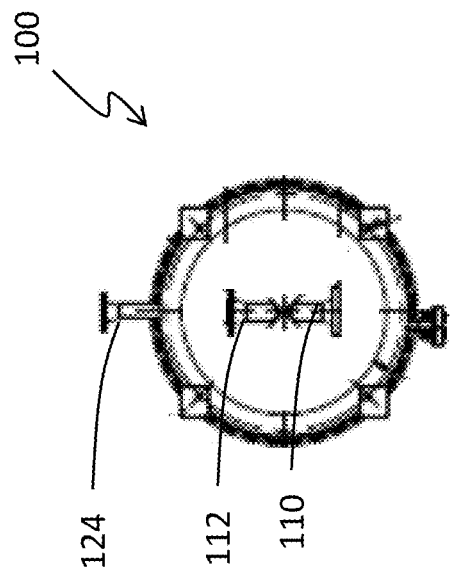
FIG. 5F illustrates a bottom view of the pressure fluctuations mitigation system of FIG. 5A.
Figure 5D:
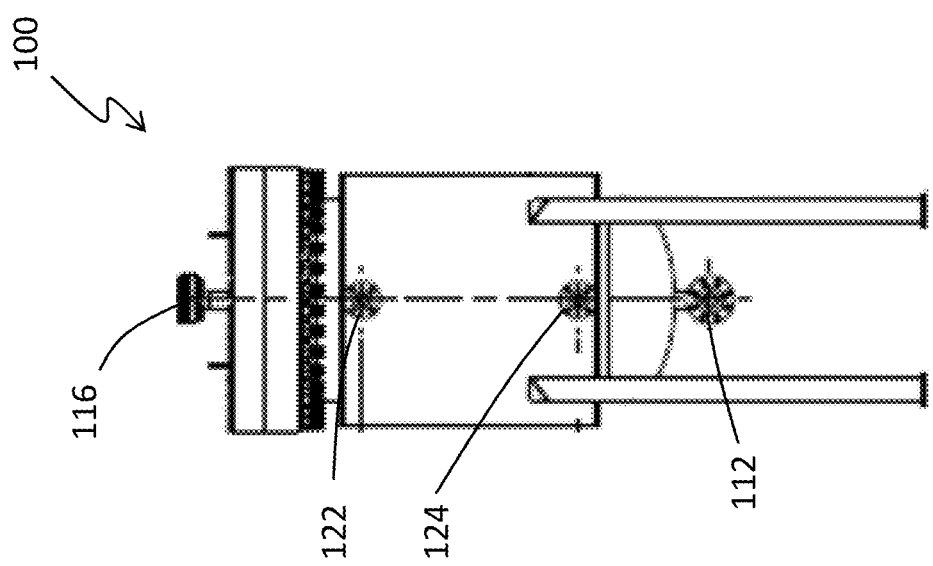
FIG. 5D illustrates a rear view of the pressure fluctuations mitigation system of FIG. 5A.

FIGS. 5A-5F illustrate different views of the pressure-mitigating system 100. FIG. 5A shows an isometric view of the pressure-mitigating system 100. FIG. 5B shows a left side view of the pressure-mitigating system 100. FIG. 5C shows a front view of the pressure-mitigating system 100. FIG. 5D shows a rear view of the pressure-mitigating system 100. FIG. 5E shows a top view of the pressure-mitigating system 100. FIG. 5F shows a bottom view of the pressure-mitigating system 100.

FIGS. 6A-6F illustrate different views of a segment 303 of a bellows assembly 104. The segment 303 can be a first segment 302 or a second segment 304 of a bellows assembly 104 having two segments (e.g., FIG. 4). In some embodiments, the segment 303 can be a stand-alone segment 303 of a bellows assembly 104 that has only one segment 303. In some embodiments, the segment 303 can be incorporated into a bellows assembly 104 having more than two segments 303 (e.g., three, four, or more than four segments 303).

Figure 6A:
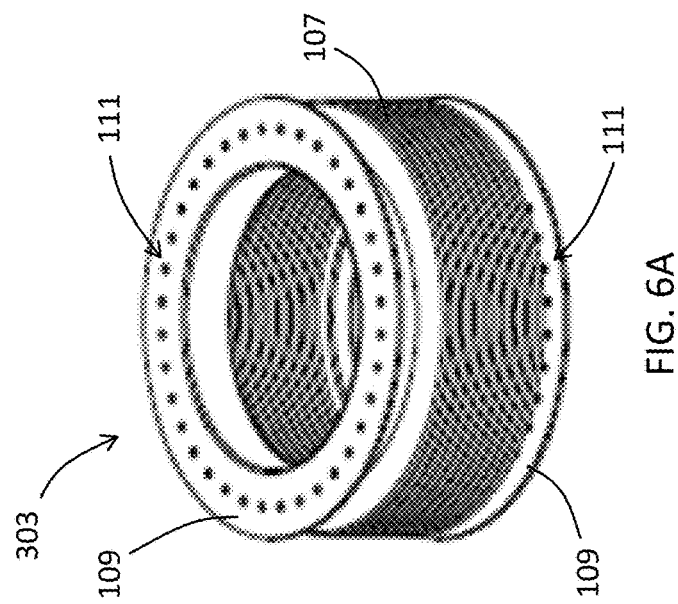
FIG. 6A illustrates an isometric view of a segment of a bellows assembly.
Figure 6D:
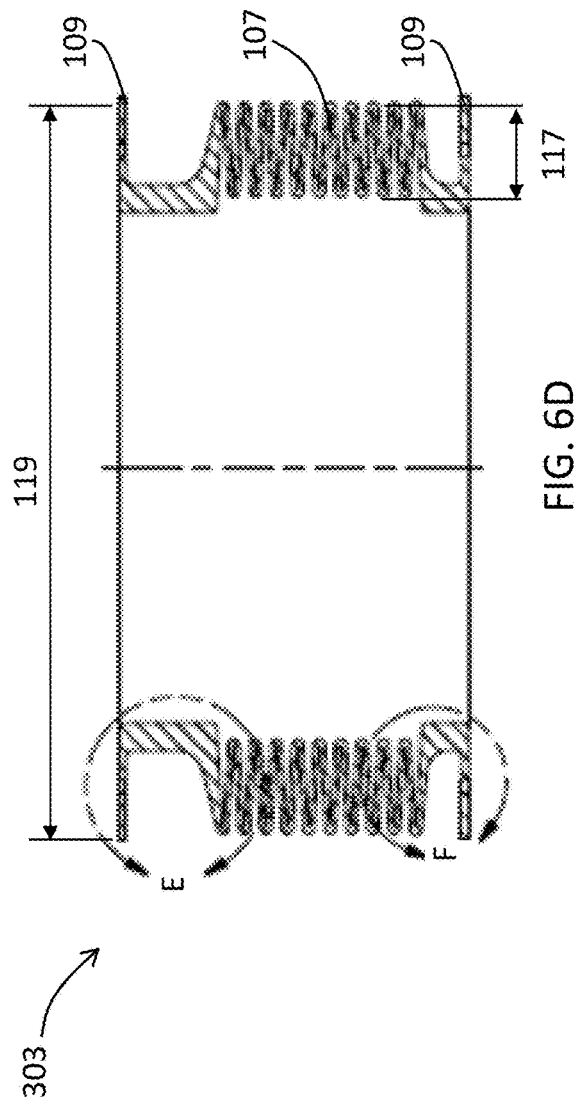
FIG. 6D illustrates a cross-sectional view of the segment of FIG. 6A.
Figure 6F:
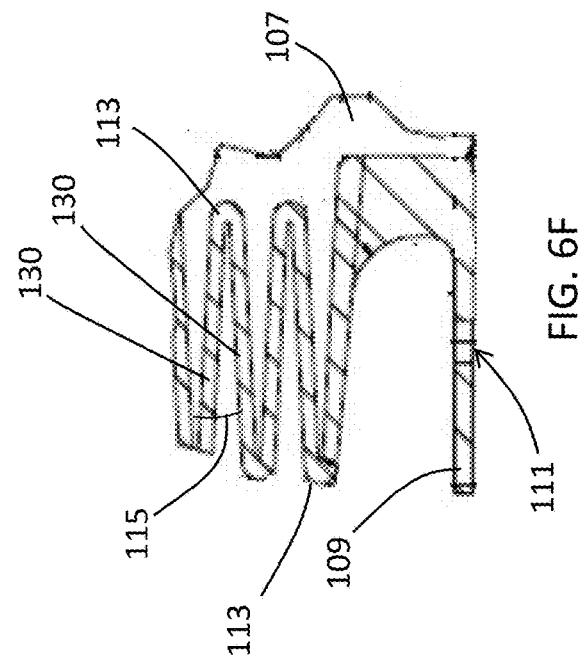
FIG. 6F illustrates a close-up view of a portion of the segment of FIG. 6D.
Figure 6E:
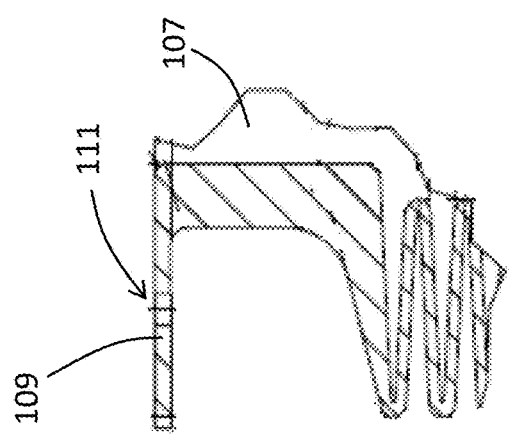
FIG. 6E illustrates a close-up view of a portion of the segment of FIG. 6D.

FIG. 6A shows an isometric view of the segment 303. As shown in FIG. 6A, the segment 303 can have a sidewall 107 that extends between opposing collar portions 109. The collar portions 109 can include a plurality of openings 111. The openings 111 can be adapted to secure the segment 303 to the cover 103, an intermediate collar structure 306 (e.g., FIG. 4), or end cap 105 (e.g., FIG. 4) of the bellows assembly 104. FIG. 6B shows a top view of the segment 303. FIG. 6C shows a side view of the segment 303. FIG. 6D shows a cross-sectional side view of the segment 303 taken along the line indicated in FIG. 6C. FIG. 6E shows a close up view of the portion of the segment 303 indicated in FIG. 6D. FIG. 6F shows a close up view of the portion of the segment 303 indicated in FIG. 6D.

As shown in FIG. 6F, the sidewall 107 can include a plurality of folds 113. The adjacent legs 130 of a fold 113 can be angled relative to one another by a fold angle 115, as shown in FIG. 6F. In the illustrated embodiment, the fold angle 115 is about 6 degrees. In some embodiments, the fold angle 115 is within the range between about: 1 to 20 degrees; 2 to 12 degrees; 4 to 8 degrees; or 5 to 7 degrees. The folds 113 can have a fold width 117 corresponding to the distance between opposing bends of the folds 113, as indicated in FIG. 6D. The segment 303 can have an outer diameter 119, as indicated in FIG. 6D. A fold ratio can be defined as the ratio between the fold width 117 and the bellows outer diameter 119. In the illustrated embodiment, the fold ratio is approximately 0.13. In some embodiments, the fold ratio can be approximately: 0.04, 0.06, 0.10, 0.13, 0.16, 0.2, 0.3, values between the aforementioned values, or otherwise.

Figure 7B:
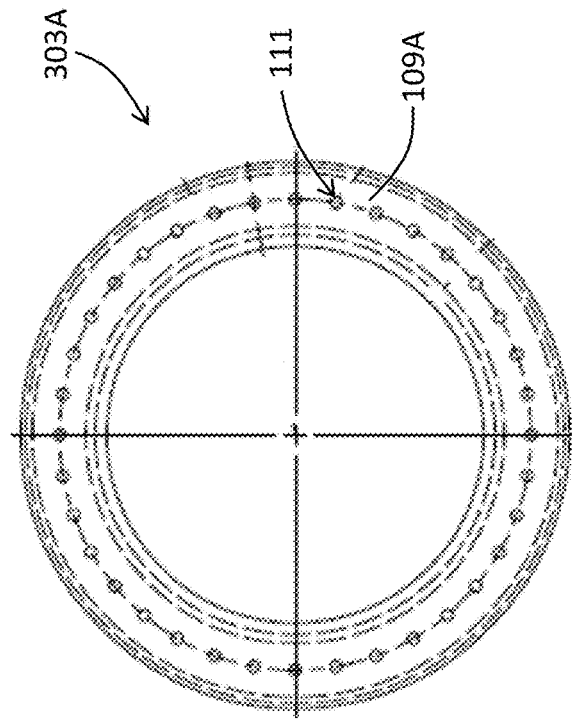
FIG. 7B illustrates a top view of the segment of FIG. 7A.
Figure 7C:
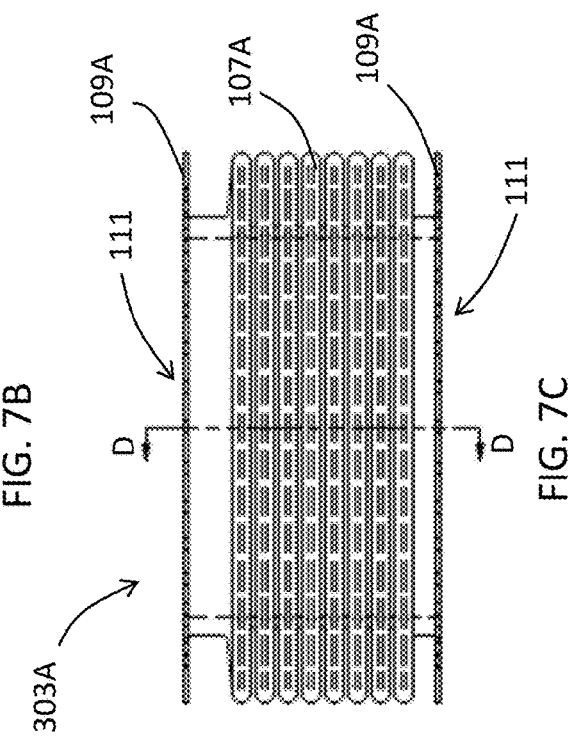
FIG. 7C illustrates a side view of the segment of FIG. 7A.
Figure 7A:
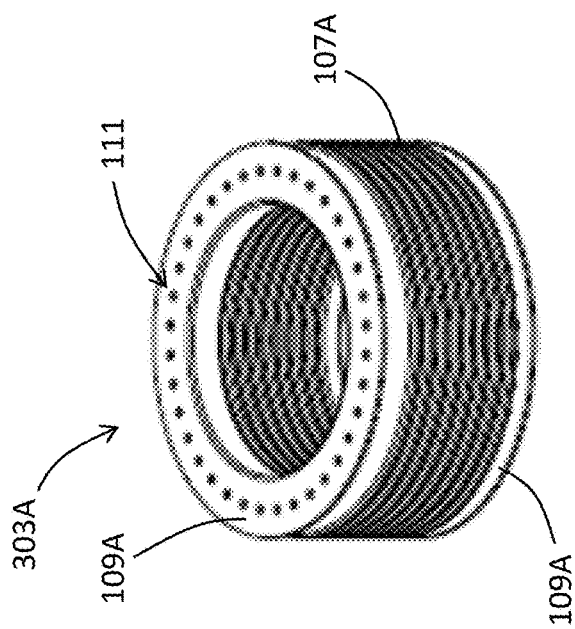
FIG. 7A illustrates an isometric view of a segment of a bellows assembly.
Figure 7D:
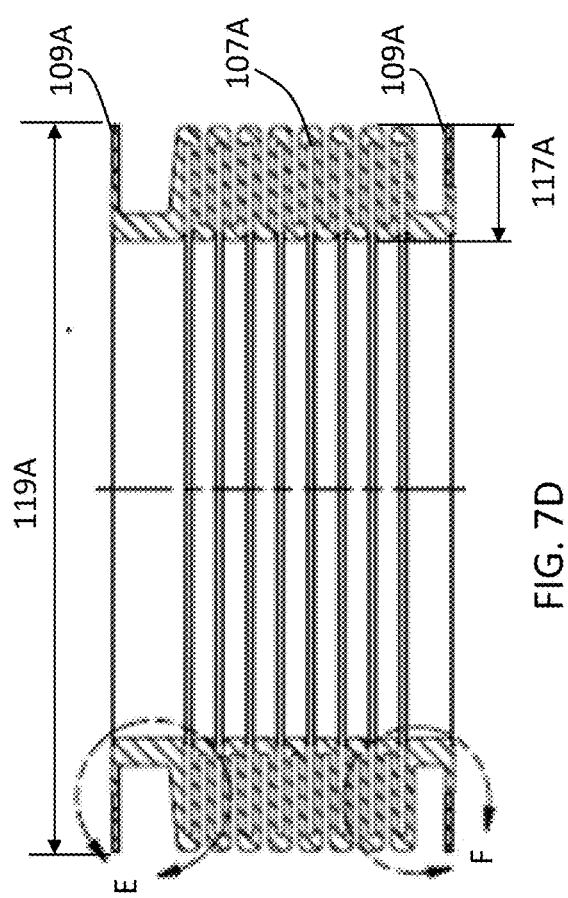
FIG. 7D illustrates a cross-sectional view of the segment of FIG. 7A.
Figure 7F:
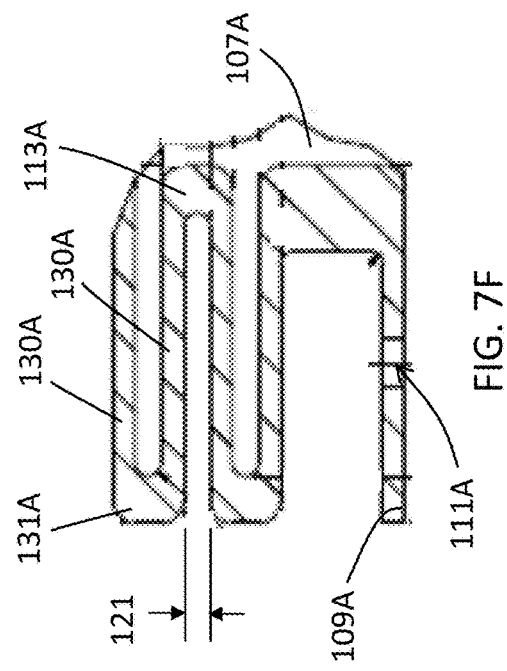
FIG. 7F illustrates a close-up view of a portion of the segment of FIG. 7D.
Figure 7E:
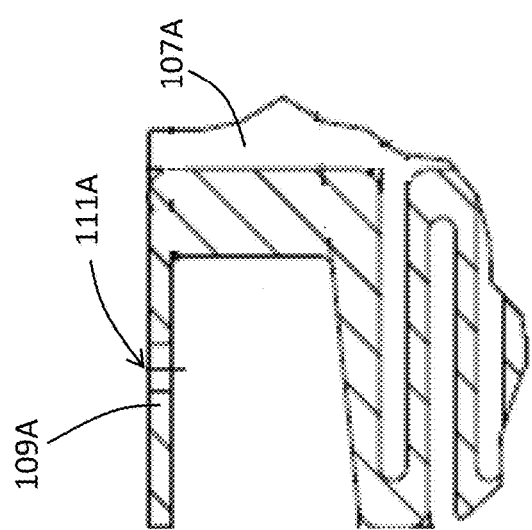
FIG. 7E illustrates a close-up view of a portion of the segment of FIG. 7D.
Figure 8B:
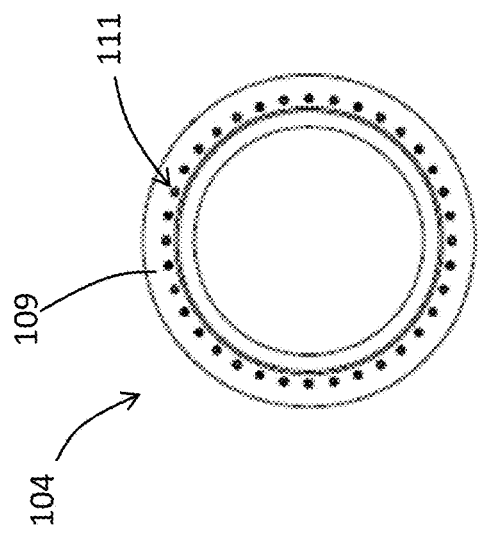
FIG. 8B illustrates a top view of the bellows assembly of FIG. 8A.
Figure 8C:
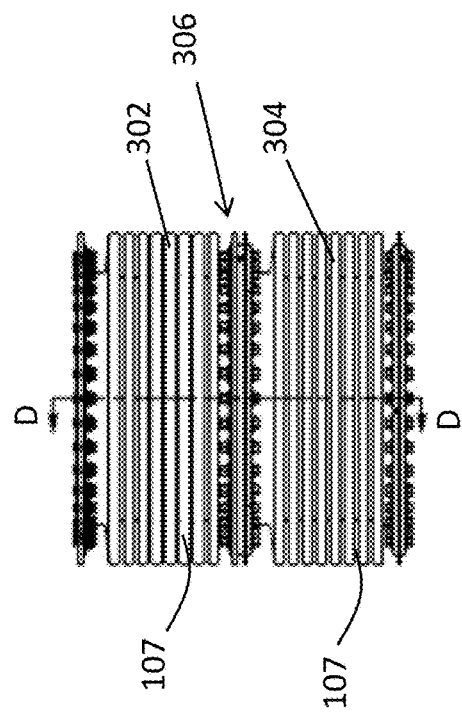
FIG. 8C illustrates a side view of the bellows assembly of FIG. 8A.
Figure 8A:
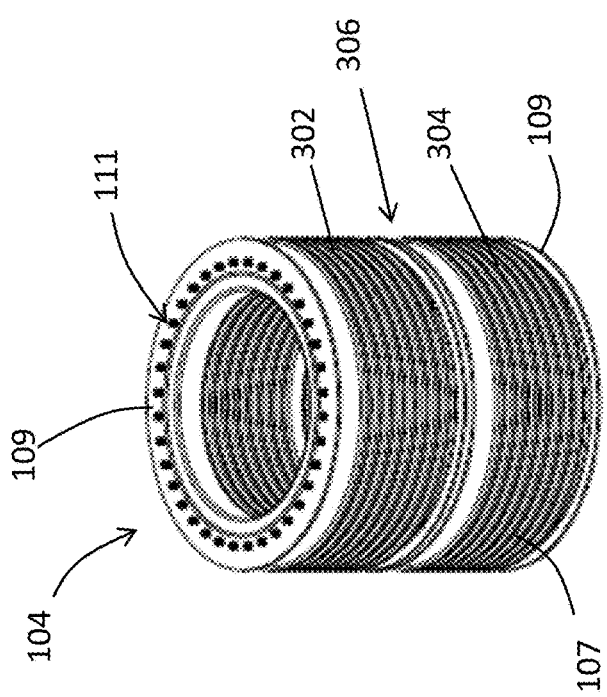
FIG. 8A illustrates an isometric view of a bellows assembly.
Figure 8D:
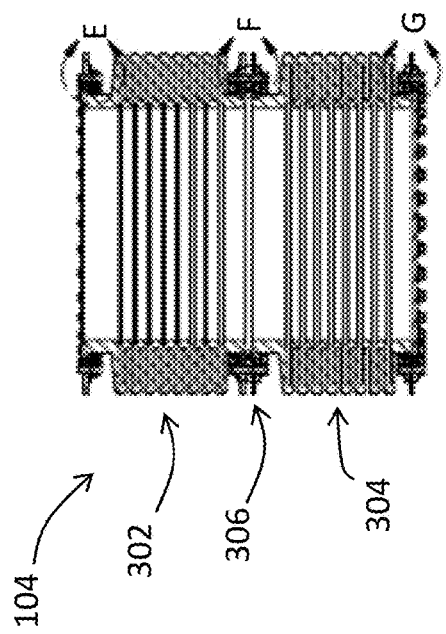
FIG. 8D illustrates a cross-sectional view of the bellows assembly of FIG. 8A.
Figure 8G:
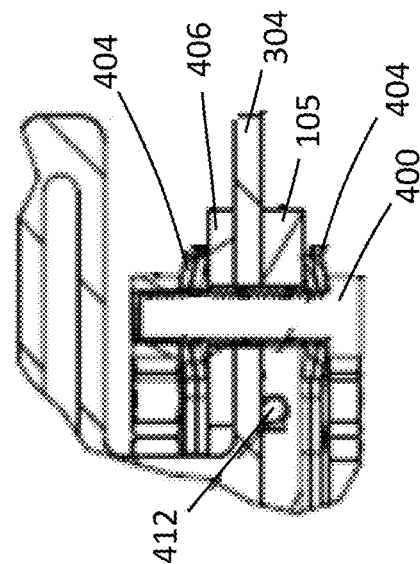
FIG. 8G illustrates a close-up view of a portion of the bellows assembly of FIG. 8D.
Figure 8F:
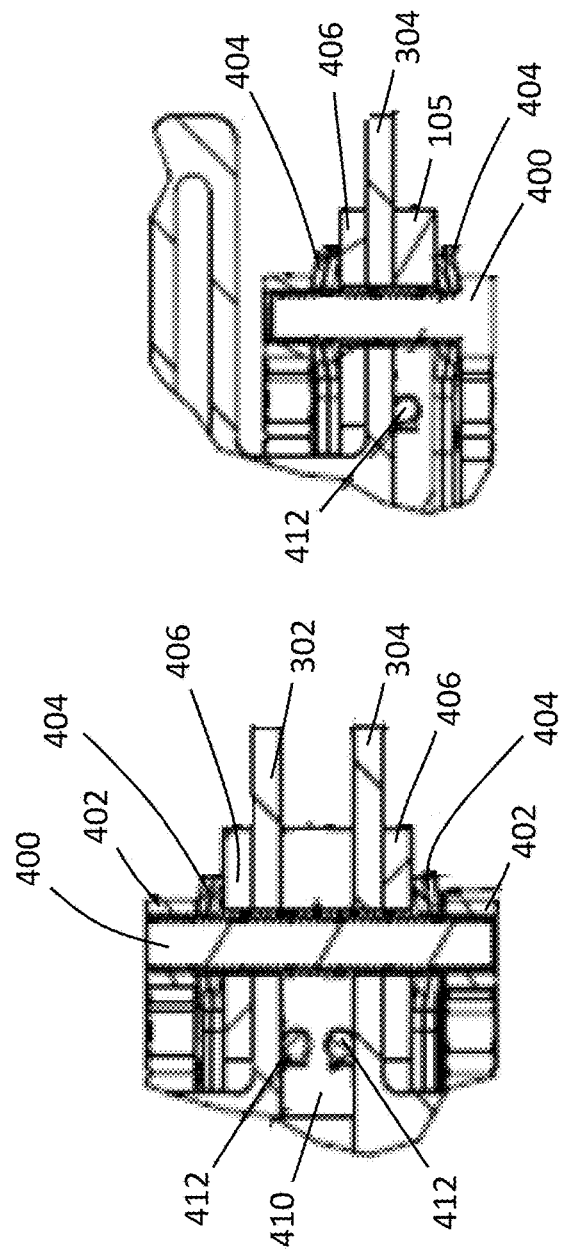
FIG. 8F illustrates a close-up view of a portion of the bellows assembly of FIG. 8D.
Figure 8E:
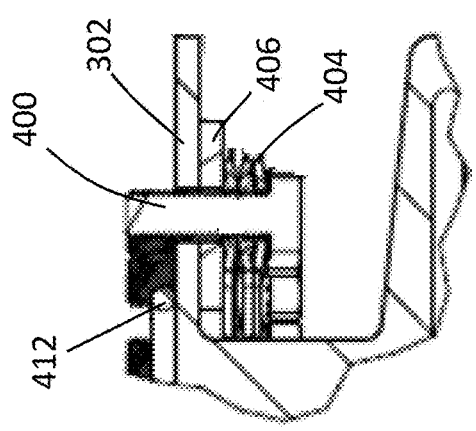
FIG. 8E illustrates a close-up view of a portion of the bellows assembly of FIG. 8D.

FIGS. 7A-7F illustrate different views of another embodiment of a segment 303A that is similar to the segment 303 except as described differently below. The features of the segment 303A can be combined or included with the segment 303 or any other embodiment discussed herein. FIG. 7A shows an isometric view of the segment 303A. FIG. 7B shows a top view of the segment 303A. FIG. 7C shows a side view of the segment 303A. FIG. 7D shows a cross-sectional side view of the segment 303A taken along the line indicated in FIG. 7C. FIG. 7E shows a close up view of the portion of the segment 303A indicated in FIG. 7D. FIG. 7F shows a close up view of the portion of the segment 303A indicated in FIG. 7D. As shown in FIG. 7F, the folds 113A can comprise a pair of adjacent legs 130A joined by a bend 131A. The adjacent legs 130A can be parallel with one another and with the collar portion 109A when the segment 303A is in a relaxed or unstressed configuration. The folds 113A can have a gap width 121 between immediately adjacent portions of the fold 113A, as indicated in FIG. 7F. In the illustrated embodiment, the gap width 121 is approximately equal to the thickness of the sidewall 107A at the fold 113A. In some embodiments, the ratio of the gap width 121 to the thickness of the sidewall 107A at the fold 113A can be about: 0.1, 0.3, 0.5, 0.8, 1.0, 1.2, 1.5, 2.0, 4.0, values between any of the aforementioned values, or otherwise. As shown in FIG. 7D, the segment 303A can have a fold ratio defined as the ratio between the fold width 117A and the bellows outer diameter 119A. In the illustrated embodiment, the fold ratio is approximately 0.16. In some embodiments, the fold ratio can be approximately: 0.04, 0.06, 0.10, 0.13, 0.16, 0.2, 0.3, values between the aforementioned values, or otherwise FIGS. 8A-8G illustrate different views of an embodiment of a bellows assembly 104 that includes a first segment 302 and a second segment 304 joined together by an intermediate collar structure 306. FIG. 8A shows an isometric view of the bellows assembly 104. FIG. 8B shows a top view of the bellows assembly 104. FIG. 8C shows a side view of the bellows assembly 104. FIG. 8D shows a cross-sectional side view of the bellows assembly 104 taken along the line indicated in FIG. 8C. FIG. 8E shows a close up view of the portion of the bellows assembly 104 indicated in FIG. 8D. FIG. 8F shows a close up view of the portion of the bellows assembly 104 indicated in FIG. 8D. FIG. 8G shows a close up view of the portion of the bellows assembly 104 indicated in FIG. 8D.

As shown in FIG. 8C, the first segment 302 and the second segment 304 can each be joined in a sealing fashion with the intermediate collar portion 306. In certain variants, the bellows assembly 104 includes two segments 302, 304 that are identical with one another. In certain variants, the bellows assembly includes two segments 302, 304 that have a structure that is different from one another. In some embodiments, the bellows assembly 104 can include more than two segments (e.g., three segments, four segments, more than four segments).

FIG. 8F shows a close up cross-sectional view of the junction between the intermediate collar portion 306 and the first and second segments 302, 304. In the illustrated embodiment, a threaded shaft 400 passes through the collar portion 109 (FIG. 8A) of the first and second segments 302, 304. A nut 402 can be used at either end of the threaded shaft 400 to secure the connection between the segments 302, 304 and the intermediate collar portion 306. One or more washers 404 can be used to provide the appropriate amount of compression to form a seal without damaging the material of the bellows assembly 104, as discussed herein. A clamp ring 406 (FIG. 10A) can be interposed between the washers 404 and the segment 302, 304, as shown in FIG. 8F. A center ring 410 (FIG. 11A) can be interposed between the first and second segments 302, 304. The center ring 410 can have on each of its opposing faces a groove that is sized to receive an o-ring 412. The o-ring 412 can be adapted to form a seal with the first and second segments 302, 304 when the nut 402 is tightened onto the threaded fastener 400. In some embodiments, the o-ring is encapsulated in a material to ensure chemical compatibility of the pressure fluctuations mitigation system 100. In some embodiments, the o-ring is encapsulated in a material such as PTFE or a fluorinated ethylene propylene resin (e.g., Teflon™ FEP). The grooves on the opposing faces of the center ring 410 can be similarly sized, as shown in FIG. 8F. The grooves can have a similar depth, radius, and can be longitudinally aligned with one another, as shown in FIG. 11D. The arrangement of the sealing features of the center ring 410 are further discussed herein with regard to FIGS. 11A-11D. As shown in FIG. 8F, the grooves can be overlapped by the clamp ring 406 such that the o-ring and the collar 109 of the segments 302, 304 are compressed together between the center ring 410 and the clamp ring 106. In this way, the PTFE segments 302, 304 can be backed by a rigid plate (e.g., steel plate) on both sides. In some embodiments, the seal formed by the intermediate collar portion 306 is adapted to contain an elevated pressure within the bellows assembly 104. In some embodiments, the bellows assembly 104 can maintain a pressure of about: 100 psi; 150 psi; 300 psi; 600 psi; 900 psi; or values between any of the aforementioned values. In some embodiments, the seal formed by the intermediate collar portion 306 is adapted to maintain a higher pressure within the bellows assembly relative to the pressure within the pressure vessel 102. In some embodiments, the bellows assembly 104 can maintain, relative to the pressure vessel, a pressure difference of about: 100 psi; 150 psi; 300 psi; 600 psi; 900 psi; or values between any of the aforementioned values. FIG. 8E shows a similar arrangement for forming a seal between the bellows assembly 104 and the cover 103 of the pressure vessel 102. FIG. 8G shows a similar arrangement for forming a seal between the bellows assembly 104 and the end cap 105.

FIGS. 8E-8G illustrate that the washers 404 can be bent or curved (e.g., Belleville washer). In some arrangements, the washers 404 are nested with one another so that the curved surfaces are oriented in the same direction (e.g., FIG. 8F). In some arrangements, the washers 404 can be arranged so that the curved surfaces of adjacent washers 404 face in opposite directions (e.g., FIG. 8E). The arrangement of the intermediate collar portion 306 can be selected so that the bellows assembly 104 is under sufficient compression to form a seal without damaging the material of the bellows assembly 104. In some arrangements, the segments 302, 304 are made of polytetrafluoroethylene (PTFE) and the threaded fastener 402 is tightened to a torque of 20 ft-lbs to create a seal while avoiding causing the PTFE to creep. In some embodiments, the threaded fastener 402 is tightened to a torque of about: 10 ft-lbs; 15 ft-lbs; 20 ft-lbs; 30 ft-lbs; 40 ft-lbs; a value between the aforementioned values; or otherwise. In some embodiments, the segments 302, 304 are made of PTFE and one or more components of the intermediate collar portion 306 is made of steel. In some embodiments, at all mechanical joints, the PTFE is backed by a stainless steel plate on both sides (and in the center in the case of the joint between the two PTFE bellows segments). In some embodiments, the parts of the bellows assembly 104 can be bolted through.

FIGS. 9A-9D illustrate different views of a cover 103 of the pressure vessel 102. FIG. 9A shows an isometric view of the cover 103. FIG. 9B shows a top view of the cover 103. FIG. 9C shows a cross-sectional side view of the cover 103 taken along the line indicated in FIG. 9B. FIG. 9D shows a close up view of the portion of the cover 103 indicated in FIG. 9C. The cover 103 can include a first plurality of openings 420 for securing the cover 105 to the pressure vessel 102. The cover 103 can include a second plurality of openings 422 for securing the bellows assembly 104 to the cover, as discussed herein. The cover can have center ports 424 for connecting the charging inlet 114 and the charging outlet 116 (FIG. 1) to the cover 103. The cover 103 can include a groove 426 disposed radially inward of the second plurality of openings 422. The groove 426 can be sized to receive an o-ring 412 (FIG. 8E) adapted to form a seal between the bellows assembly 104 and the cover 105, as discussed herein.

Figure 10B:
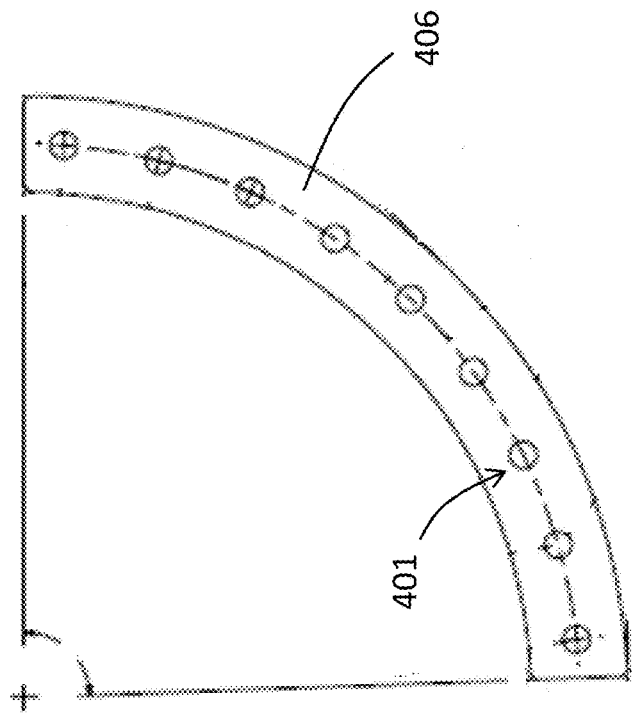
FIG. 10B illustrates a top view of the clamp ring of FIG. 10A.
Figure 10C:
FIG. 10C illustrates a side view of the clamp ring of FIG. 10A.
Figure 10A:
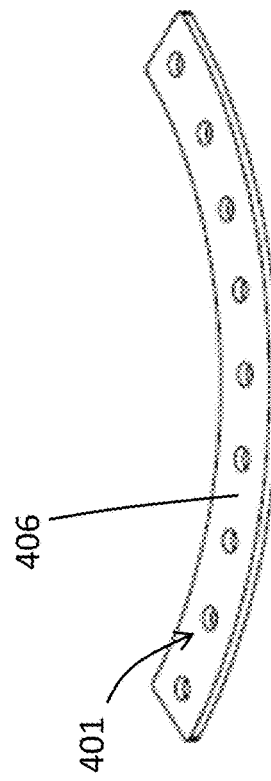
FIG. 10A illustrates an isometric view of a clamp ring of the bellows assembly.

FIGS. 10A-10C illustrate different views of a clamp ring 406. FIG. 10A shows an isometric view of the clamp ring 406. FIG. 10B shows a top view of the clamp ring 406. FIG. 10C shows a cross-sectional side view of the clamp ring 406. As shown in FIG. 10B, the clamp ring 406 can extend approximately one-quarter of circumference of the bellows assembly 104 thereby allowing the clamp ring 406 to be assembled underneath the collar 109 of the bellows assembly 104 without requiring the bellows assembly 104 to be deformed in order to seat the clamp ring 406 onto the bellows assembly 104. The clamp ring 406 can include a plurality of openings 401 to facilitate coupling the clamp ring 406 to the bellows assembly 104, as described herein.

FIGS. 11A-11D illustrate different views of a center ring 410. As discussed, the center ring 410 can be used to join a first segment 302 and a second segment 304 of the bellows assembly 104. FIG. 11A shows an isometric view of the center ring 410. FIG. 11B shows a top view of the center ring 410. FIG. 11C shows a cross-sectional side view of the center ring 410. FIG. 11 D shows a close up view of the portion of the center ring 410 indicated in FIG. 11C. As shown in FIG. 11A, the center ring 410 can include a plurality of through holes 411. The center ring 410 can have a first groove 413 disposed on a first face of the center ring 410 and a second groove 415 disposed on a second face of the center ring 410. The grooves 413, 415 can be sized to receive an o-ring 412 (FIG. 8F) adapted to form a seal between the bellows assembly 104 and the center ring 410, as discussed herein.

As shown in FIG. 11D, the grooves can have a depth that is approximately one third the thickness of the center ring 410. In the illustrated embodiment, the groove has a depth of about 0.2 inches and the center ring 410 has a thickness of about 0.625 inches. In some embodiments, the depth of the groove can be about one-fourth the thickness of the center ring 410 or about one-fifth the thickness of the center ring 410. In the illustrated embodiment, the width of the groove is about 0.3 inches. In some embodiments, the width of the groove is about: 0.10 inches, 0.20 inches, 0.21 inches; 0.30 inches, values between the aforementioned values, or otherwise. As shown in FIG. 11B, the groove can be disposed radially inward of the openings 411 that are used to secure the segment 302, 304 to the center ring 410. In the illustrated embodiment, the grooves are approximately equidistant from the openings 411 and the central opening 451. In the illustrated embodiment, the openings 411 have a diameter of about 1 inch and are disposed at a radius of about 11.5 inches from the center of the center ring 410, the grooves are disposed at a radius of about 10.5 inches from the center of the center ring 410, and the central opening 451 has a radius of about 10 inches. In some embodiments, the grooves can be disposed closer to the central opening 451 than to the openings 411. In some embodiments, the grooves can be disposed closer to the openings 411 than to the central opening 451.

FIGS. 12A-12D illustrate different views of the end cap 105. As discussed, the end cap 105 can be used to seal the end of the bellows assembly 104 that is opposite the end attached to the cover 103 of the pressure vessel 102. FIG. 12A shows an isometric view of the end cap 105. FIG. 12B shows a top view of the end cap 105. FIG. 12C shows a cross-sectional side view of the end cap 105. FIG. 12D shows a close up view of the portion of the end cap 105 indicated in FIG. 12C. As shown in FIG. 12A, the end cap 105 can include a plurality of through holes 411. The end cap 105 can have a groove 417 disposed on a face of the end cap. The groove 417 can be sized to receive an o-ring 412 (FIG. 8G) that is adapted to form a seal between the bellows assembly 104 and the end cap 105, as discussed herein.

Figure 13B:
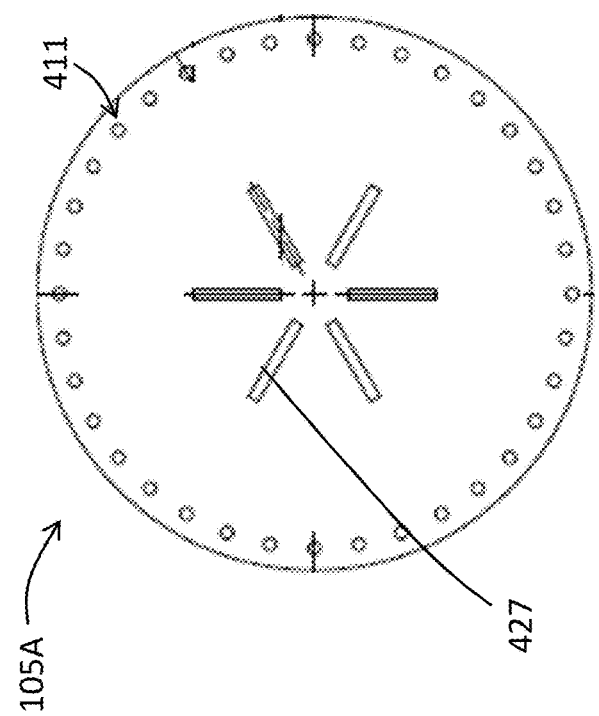
FIG. 13B illustrates a top view of the end cap of FIG. 13A.
Figure 13C:
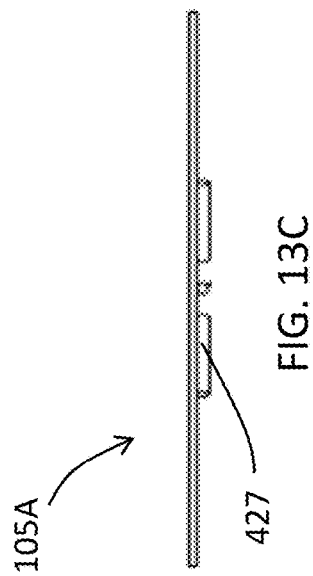
FIG. 13C illustrates a side view of the end cap of FIG. 13A.
Figure 13A:
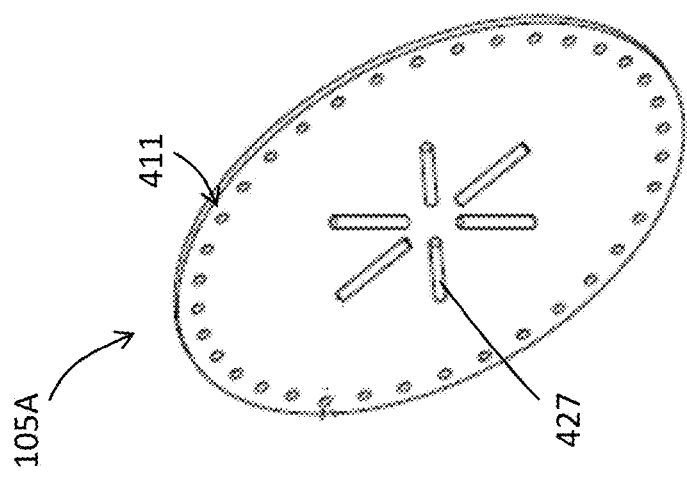
FIG. 13A illustrates an isometric view of an end cap of the bellows assembly.

FIGS. 13A-13D illustrate different views of a reinforced end cap 105A. The reinforced end cap 105A can be similar to the end cap 105 except as described differently below. The features of the reinforced end cap 105A can be combined or included with the end cap 105 or any other embodiment discussed herein. FIG. 13A shows an isometric view of the reinforced end cap 105A. FIG. 13B shows a top view of the reinforced end cap 105A. FIG. 13C shows a side view of the reinforced end cap 105A. As shown in FIG. 13A, the reinforced end cap 105A can include a plurality of through holes 411. The reinforced end cap 105A can have a plurality of weldments 427 disposed on a face of the reinforced end cap 105A. The weldments 427 can be adapted to resist deformation (e.g., bucking) of the end cap 105A such as when the bellows assembly 104 is under pressure. In some embodiments, the weldments 427 can be tack ends of rods 212 that are welded to the cover 105.

FIGS. 14A and 14B illustrate that the pressure-mitigating system 100 can include an internal support system 500 that prevents over-travel of the bellows assembly 104. The internal support system 500 can be used in conjunction with, or independent of, the divider plate 106 (FIG. 1). As shown in FIG. 14A, the internal support system 500 can prevent over-compression of both the first segment 302 and the second segment 304. FIG. 14B shows the internal support system 500 can be adapted to prevent over-extension of the first segment 302. For the sake of clarity, the internal support system 500 will be described with respect to limiting travel of the first segment 302. However, in certain embodiments the internal support system 500 can limit: only compression of only the first segment 302; only compression of only the second segment; only compression of both the first segment 302 and the second segment 304; only extension of only the first segment 302; only extension of only the second segment; only extension of both the first segment 302 and the second segment 304; compression and extension of only the first segment 302; compression and extension of only the second segment 304; compression and extension of both the first segment 302 and the second segment 304; and other combinations thereof.

Referring again to FIG. 14A, the internal support system 500 can have a barrier 502 that is fixed relative to the pressure vessel 102. The barrier 502 can be disposed within, or outside of, the enclosed space of the bellows assembly 104. For example, the barrier 502 can be suspended into the bellows assembly 104 from the cover 103, or the barrier 502 can extend radially inward from an inner surface of the pressure vessel 102. The barrier 502 can overlap with a flange 504 on the center ring 410 or the end cap 105. As shown in FIG. 14A, the barrier 502 can limit the extent to which the center ring 410 can approach the cover 103 of the pressure vessel 102, thereby limiting over-compression of the first segment 302. FIG. 14A shows the internal support system 500 can include a second barrier adapted to interact with the end cap 105 to prevent over-compression of the second segment 304.

FIG. 14B shows the barrier 502 can be positioned such that the flange 504 is between the barrier 502 and the cover 103, thereby limiting over-extension of the first segment 302. Although not shown in FIG. 14B, the internal support system 500 can include a second barrier similar to the second barrier shown in FIG. 14A in order to limit over-extension of the second segment 304. In some embodiments, the divider plate 106 (FIG. 1) can prevent over-extension of the second segment 304.

Figure 15A:
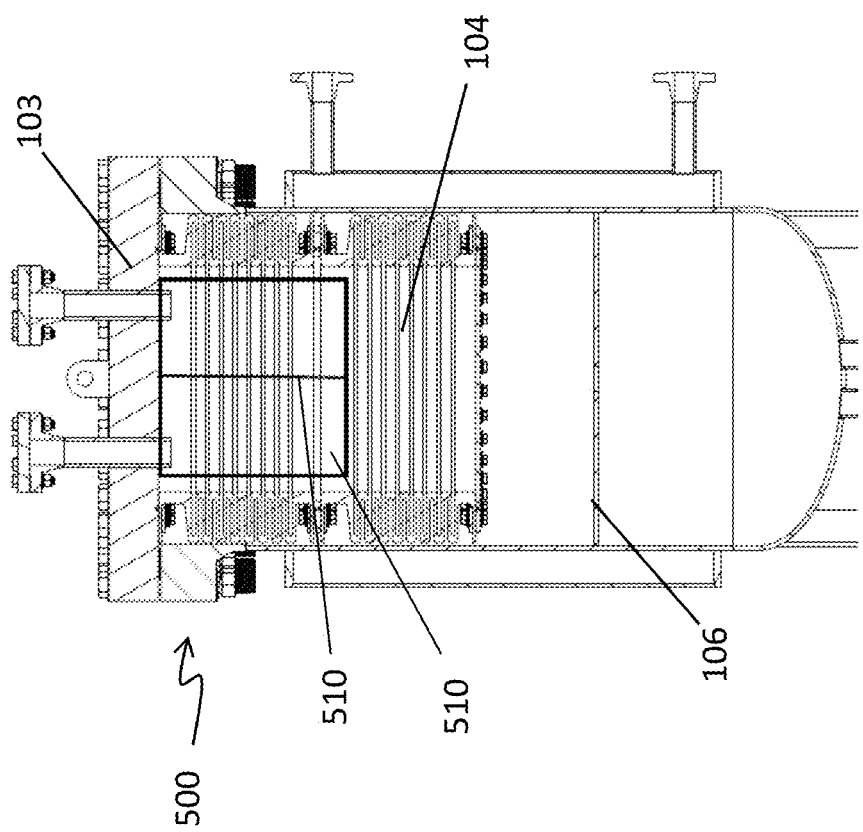
FIG. 15A illustrates an embodiment of an internal support system.
Figure 15B:
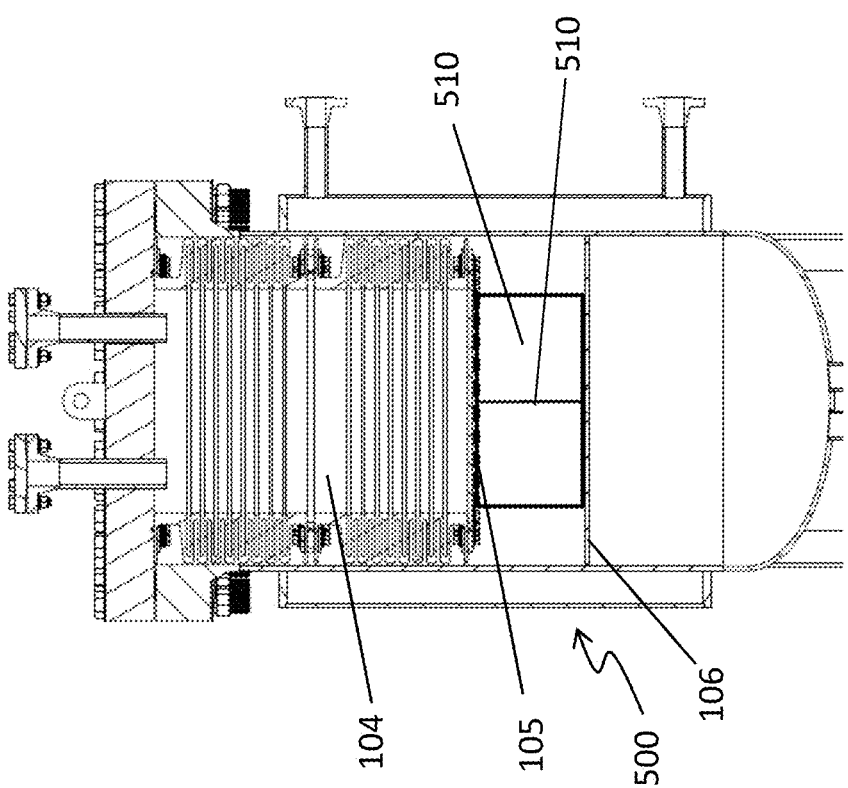
FIG. 15B illustrates an embodiment of an internal support system.

FIGS. 15A and 15B show other illustrative examples of the internal support system 500. The internal support system 500 can include two plates 510 that are in the shape of an "X" when the plates 510 are viewed from above. As shown in FIG. 15A, the plates 510 can be positioned between the divider plate 106 and the end cap 105 to limit extension of the bellows assembly 104. As shown in FIG. 15B, the plates 510 can be attached to cover 103 and suspended within the bellows assembly 104 to limit compression of the bellows assembly 104.

An aspect of the present disclosure is a multi-component bellows assembly 104 having a sealing system between the components of the bellows assembly 104 that allows the bellows to perform under large temperature and pressure swings as a bellows made of a singular piece would. In some variants, the bellows can be installed upside down relative to the orientation shown in FIG. 1, which can provide another level of support to the bellows and possibly extend the life of the bellows assembly. For example, rather than the bellows assembly 104 being suspended from the cover 103, the bellows assembly 104 can be inverted within the pressure vessel 102 such that when the bellows assembly 104 is charged it expands along a direction that is opposite the gravitational force that would normally collapse the bellows assembly 104 onto the bottom of the pressure vessel 102. This inverted orientation of the bellows assembly 104 can help extend the life of the bellows as the relaxed (e.g., unpressurized) state of the bellows would collapse the bellows assembly 104 rather than distend the bellows assembly 104.

In certain embodiments, the bellows assembly is configured to handle pressure events in a piping system of potentially hazardous fluids (e.g., di-nitrile toluene). In one implementation, the bellows assembly can handle pressure events with pressure exceeding 600 psi and temperatures maintained above 190 F during operation.

Certain Terminology

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. Furthermore, where the terms "and" and "or" are used in conjunction with a list of items, they are to be interpreted broadly, in that any one or more of the listed items may be used alone or in combination with other listed items.

What is claimed is:

1. A pressure fluctuation mitigation system comprising:
   a pressure vessel comprising a flow inlet, a flow outlet, and a cover, each of the flow inlet and the flow outlet providing a flow path to an interior space enclosed by the cover and the pressure vessel;
   a bellows assembly comprising a first segment and a second segment, each of the first and second segments comprising a first collar portion, a second collar portion, and a sidewall extending between the first and second collar portions, the sidewall having a generally hollow cylindrical shape and comprising a plurality of folds, the first collar portion of the first segment attached to the cover;
   a center ring disposed between the first and second segments, the first collar portion of the second segment disposed between the center ring and the second collar portion of the second segment, the center ring adapted to form a seal with each of the first and second segments such that the bellows assembly can maintain a pressure that is at least 150 pounds per square inch (psi) above a pressure within the pressure vessel; and
   an end cap attached to the second collar portion of the second segment, wherein the cover, the end cap, and the bellows assembly define an internal space that is fluidically isolated from the interior space of the pressure vessel.

2. The pressure fluctuation mitigation system of claim 1, wherein the first and second segments are each made of polytetrafluoroethylene (PTFE).

3. The pressure fluctuation mitigation system of claim 2, wherein the first segment has an outer diameter within a range of 18 inches to 36 inches.

4. The pressure fluctuation mitigation system of claim 3, wherein the outer diameter is within a range of 25 inches to 27 inches.

5. The pressure fluctuation mitigation system of claim 1, wherein each of the plurality of folds comprises a pair of adjacent legs joined by a bend disposed therebetween, wherein each of the pair of adjacent legs is oriented parallel with the first collar portion when the first segment is in an unpressurized configuration.

6. The pressure fluctuation mitigation system of claim 5, wherein a fold ratio is defined as a ratio between a width of a one of the adjacent legs and an outer diameter of the first segment, wherein the fold ratio is between 0.1 and 0.2.

7. The pressure fluctuation mitigation system of claim 1, wherein each of the plurality of folds comprises a pair of adjacent legs joined by a bend disposed therebetween, wherein the pair of adjacent legs are angled relative to one another when the first segment is in an unpressurized configuration.

8. The pressure fluctuation mitigation system of claim 7, wherein the adjacent legs are angled relative to one another by an angle within a range between 4 to 8 degrees.

9. The pressure fluctuation mitigation system of claim 8, wherein the angle is 6 degrees.

10. The pressure fluctuation mitigation system of claim 1, wherein the sidewall of the first segment comprises a plurality of outer grooves on an outer surface of the sidewall, each of the plurality of outer grooves circumferentially surrounding a longitudinal axis of the sidewall while maintaining a fixed longitudinal position with respect to the sidewall.

11. The pressure fluctuation mitigation system of claim 10, wherein the sidewall of the first segment further comprises a plurality of inner grooves on an inner surface of the sidewall, each of the plurality of inner grooves circumferentially surrounding a longitudinal axis of the sidewall while maintaining a fixed longitudinal position with respect to the sidewall.

12. The pressure fluctuation mitigation system of claim 11, wherein the plurality of inner grooves interdigitate the plurality of outer grooves.

13. A pressure fluctuation mitigation system comprising:
   a pressure vessel comprising a flow inlet, a flow outlet, and a cover, each of the flow inlet and the flow outlet providing a flow path to an interior space enclosed by the cover and the pressure vessel;
   a bellows assembly comprising a first segment and a second segment, each of the first and second segments comprising a first collar portion, a second collar portion, and a sidewall extending between the first and second collar portions, the sidewall having a generally hollow cylindrical shape and comprising a plurality of folds,
   wherein each of the first and second segments is made of PTFE and has an outer diameter of between 18 inches and 36 inches;
   a center ring disposed between the first and second segments and adapted to form a seal with each of the first and second segments; and
   an end cap attached to the second collar portion of the second segment, wherein the cover, the end cap, and the bellows assembly define an internal space that is fluidically isolated from the interior space of the pressure vessel.

14. The pressure fluctuation mitigation system of claim 13, wherein the outer diameter of each of the first and second segments is between 25 inches and 27 inches.

15. The pressure fluctuation mitigation system of claim 13, wherein each of the plurality of folds comprises a pair of adjacent legs joined by a bend disposed therebetween, wherein each of the pair of adjacent legs is oriented parallel with the first collar portion when the first and second segments are in an unpressurized configuration.

16. The pressure fluctuation mitigation system of claim 15, wherein a fold ratio is defined as a ratio between a width of a one of the adjacent legs and the outer diameter, wherein the fold ratio is between 0.1 and 0.2.

17. The pressure fluctuation mitigation system of claim 13, wherein each of the plurality of folds comprises a pair of adjacent legs joined by a bend disposed therebetween, wherein the pair of adjacent legs are angled relative to one another by an angle within a range between 4 to 8 degrees when the first and second segments are in an unpressurized configuration.

18. A method of manufacturing a pressure fluctuation mitigation system, the method comprising:
  obtaining a pressure vessel comprising a flow inlet, a flow outlet, and a cover, each of the flow inlet and the flow outlet providing a flow path to an interior space enclosed by the cover and the pressure vessel;
  manufacturing each of a first segment and a second segment of a bellows assembly by at least:
    obtaining a hollow cylindrical form of PTFE having an outer diameter within a range of 18 inches to 36 inches;
    cutting a first plurality of grooves on an outer surface of the hollow cylindrical form, each of the first plurality of grooves circumferentially surrounding a longitudinal axis of the hollow cylindrical form while maintaining a fixed longitudinal position with respect to the hollow cylindrical form; and
    cutting a second plurality of grooves on an inner surface of the hollow cylindrical form, each of the second plurality of grooves circumferentially surrounding the longitudinal axis of the hollow cylindrical form while maintaining a fixed longitudinal position with respect to the hollow cylindrical form, wherein the hollow cylindrical form of PTFE is held by the inner surface during the cutting the first plurality of grooves;
  disposing a center ring between the first and second segments, the center ring adapted to form a seal with each of the first and second segments;
  attaching an end cap to a collar portion of the second segment; and
  attaching the cover to a collar portion of the first segment, wherein the cover, the end cap, and the bellows assembly define an internal space that is fluidically isolated from the interior space of the pressure vessel.

19. The method of claim 18, wherein the hollow cylindrical form of PTFE is held by the outer surface during the cutting the second plurality of grooves.

20. The method of claim 18, wherein the second plurality of grooves interdigitate with the first plurality of grooves.

* * * * *